(12) United States Patent
Hirata et al.

(10) Patent No.: US 12,486,398 B2
(45) Date of Patent: Dec. 2, 2025

(54) FIBER-REINFORCED POLYAMIDE RESIN COMPOSITION MOLDED ARTICLE

(71) Applicant: Toray Industries, Inc., Tokyo (JP)

(72) Inventors: Shin Hirata, Nagoya (JP); Mitsushige Hamaguchi, Nagoya (JP); Nobuhiro Morioka, Nagoya (JP); Takafumi Suzuki, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 577 days.

(21) Appl. No.: 18/016,884

(22) PCT Filed: Aug. 18, 2021

(86) PCT No.: PCT/JP2021/030213
§ 371 (c)(1),
(2) Date: Jan. 19, 2023

(87) PCT Pub. No.: WO2022/044920
PCT Pub. Date: Mar. 3, 2022

(65) Prior Publication Data
US 2023/0272216 A1    Aug. 31, 2023

(30) Foreign Application Priority Data

Aug. 28, 2020  (JP) .................. 2020-144268
Aug. 28, 2020  (JP) .................. 2020-144269

(51) Int. Cl.
*C08L 77/00* (2006.01)
*C08K 3/04* (2006.01)
*C08K 5/17* (2006.01)
*C08K 7/06* (2006.01)

(52) U.S. Cl.
CPC ............ *C08L 77/00* (2013.01); *C08K 3/04* (2013.01); *C08K 5/17* (2013.01); *C08K 7/06* (2013.01)

(58) Field of Classification Search
CPC .......... C08J 2377/00; C08J 5/046; C08J 5/10; C08K 3/04; C08K 5/17; C08K 7/06; C08L 2205/16; C08L 27/18; C08L 51/003; C08L 51/06; C08L 61/14; C08L 67/02; C08L 77/00; C08L 77/02; C08L 77/06; C08L 81/04
See application file for complete search history.

(56) References Cited

U.S. PATENT DOCUMENTS

| | | |
|---|---|---|
| 2012/0028047 A1 | 2/2012 | Imai et al. |
| 2015/0291789 A1 | 10/2015 | Hirata et al. |
| 2017/0029580 A1 | 2/2017 | Hirata et al. |
| 2022/0204729 A1 | 6/2022 | Morioka et al. |

FOREIGN PATENT DOCUMENTS

| | | |
|---|---|---|
| JP | H11-140237 A | 5/1999 |
| JP | 2012-162613 A | 8/2012 |
| JP | 2013-249363 A | 12/2013 |
| JP | 2019-151712 A | 9/2019 |
| JP | 2021-014499 A | 2/2021 |
| WO | 2010/107022 A1 | 9/2010 |
| WO | 2014/098103 A1 | 6/2014 |
| WO | 2017/110323 A1 | 6/2017 |
| WO | 2021/006257 A1 | 1/2021 |

OTHER PUBLICATIONS

English translation of the International Preliminary Report on Patentability and Written Opinion dated Feb. 28, 2023, of counterpart International Application No. PCT/JP2021/030213.
International Search Report dated Oct. 19, 2021 in counterpart International Application No. PCT/JP2021/030213.
Written Opinion dated Oct. 19, 2021 in counterpart International Application No. PCT/JP2021/030213.

*Primary Examiner* — Ana L. Woodward
(74) *Attorney, Agent, or Firm* — DLA Piper LLP (US)

(57) ABSTRACT

A fiber-reinforced polyamide resin composition molded article is characterized by 5 to 50 parts by weight of reinforcing fibers, 40 to 94.9 parts by weight of a polyamide resin composition, and 0.1 to 10 parts by weight of an ammonium salt composed of ammonia and an aliphatic dicarboxylic acid having 6 to 12 carbon atoms, and which is also characterized in that: a weight average fiber length of the reinforcing fibers is 0.4 to 7 mm; the polyamide resin composition comprises a polyamide resin, a second resin having a reactive functional group, and a compound produced by a reaction of the resin and the second resin; and the second resin is dispersed in a form of particles with a number average particle diameter of 10 to 1,000 nm.

11 Claims, 2 Drawing Sheets

FIBER-REINFORCED POLYAMIDE RESIN COMPOSITION MOLDED ARTICLE

TECHNICAL FIELD

This disclosure relates to a fiber-reinforced polyamide resin composition molded article comprising a polyamide resin composition and reinforcing fibers.

BACKGROUND

Molded articles containing reinforcing fibers and a polyamide resin composition are widely used in sporting goods, aerospace and general industrial applications due to their light weight and excellent mechanical properties. As the reinforcing fibers used in these molded articles, metal fibers such as aluminum fibers and stainless steel fibers, inorganic fibers such as silicon carbide fibers and carbon fibers and organic fibers such as aramid fibers and polyparaphenylene benzoxazole (PBO) fibers.

Further, because molded articles containing reinforcing fibers and a polyamide resin composition have excellent light weight and mechanical properties, they are used in fields such as sports parts and automobile parts, and recently, also used in fields such as electronic equipment housings and exterior parts for home appliances. In particular, because parts for sports applications, electronic equipment housings and home appliance applications are required to be further lighter and thinner, high flowability during molding is required, and further, because they are also used as exterior members, a good appearance quality, especially a high fiber dispersibility, of the surface of the molded article is required. Moreover, since the molded article is required to have flexural strength and impact resistance when dropped or applied with impact, a molded article comprising a molding material capable of exhibiting both high appearance quality and mechanical properties, and exhibiting a high flowability that can realize to reduce weight and thickness. Furthermore, although parts for sports applications, electronic equipment housings, and home appliance applications are required to be further lighter and thinner, it is known that a deflection of a molded article generates because a reduction in stiffness due to water absorption of the molded article occurs under a usual environment. Therefore, a molded article, that can exhibit stiffness even when it absorbs water, is required.

As a means of enhancing mechanical properties, a fiber-reinforced polyamide resin composition molded article containing carbon fibers, organic fibers and a polyamide resin composition wherein the average fiber length and average fiber end-to-end distance of carbon fibers and the average fiber length and average fiber end-to-end distance of organic fibers are within respective specific ranges (for example, see WO 2014/098103), and a fiber-reinforced resin composition containing carbon fiber, a polyamide resin composition and a resin having a reactive functional group (for example, see WO 2010/107022), are proposed.

Further, as a technology for improving a flowability during molding of a molded article, a resin composition containing a dendritic polyester in the molded article is proposed (for example, see JP-A-2013-249363).

Furthermore, as a method of suppressing a water absorption of a molded article, a resin composition containing a polyolefin resin or an aromatic polyamide in the molded article is proposed (for example, see JP-A-11-140237 and JP-A-2019-151712).

As molded articles obtained by WO '103 and WO '022 to improve the impact strength, it is described to add organic fibers and a resin having a reactive functional group in addition to carbon fibers. Further, JP '363 describes that flowability can be improved by adding a dendritic polyester to a polyamide resin composition.

Further, JP '237 describes that the water absorption rate of a molded article is suppressed by adding a polyolefin resin to a polyamide resin composition. Moreover, JP '712 describes that the water absorption rate of a molded article is suppressed by using an aromatic polyamide resin having a low water absorption rate as the matrix resin.

However, since in the molded article obtained in WO '103, it is only described that it can exhibit a high impact strength by containing carbon fibers and organic fibers, and WO '103 does not mention flowability and fiber dispersibility of a molded article comprising a polyamide resin composition, the obtained molded article was insufficient in flowability and fiber dispersibility. Further, although it is described that the molded article obtained in WO '022 can exhibit a high impact strength by using a resin having a reactive functional group, WO '022 also does not mention flowability and fiber dispersibility of a molded article. Further, in the molded article obtained by JP '363, because a dendritic polyester is contained, it is characterized in that the flowability of the molded article is high, but improvement in fiber dispersibility is insufficient.

Furthermore, in the molded articles obtained by JP '237 and JP '712, because polyolefin resins and aromatic polyamide resins with low water absorption rates are contained, they are characterized in that the molded articles can have a high stiffness upon water absorption, but improvement in fiber dispersibility is insufficient.

Thus, in the conventional technologies, in the fiber-reinforced polyamide resin composition molded articles with a polyamide resin composition as a matrix, a fiber-reinforced polyamide resin composition molded article excellent in mechanical properties (including bending property and impact resistance), excellent in fiber dispersibility of the molded article, and further excellent in moldability (flowability) and stiffness upon water absorption (low water absorption) has not been obtained, and the development of such a fiber-reinforced polyamide resin composition molded article has been desired.

It could be helpful to provide a fiber-reinforced polyamide resin composition molded article that is excellent in mechanical properties (bending property, impact resistance), excellent in fiber dispersibility and moldability, and further, excellent in stiffness upon water absorption.

SUMMARY

We thus provide:

(1) A fiber-reinforced polyamide resin composition molded article characterized by comprising 5 to 50 parts by weight of reinforcing fibers (A), 40 to 94.9 parts by weight of a polyamide resin composition (B), and 0.1 to 10 parts by weight of an ammonium salt (C) composed of ammonia and an aliphatic dicarboxylic acid having 6 to 12 carbon atoms, and characterized in that a weight average fiber length (Lwa1) of the reinforcing fibers (A) is 0.4 to 7 mm, the polyamide resin composition (B) comprises a polyamide resin (B1), a resin (B2) having a reactive functional group, and a compound (B3) produced by a reaction of the resin (B1) and the resin (B2), and the resin (B2) is dispersed in a form of particles with a number average particle diameter of 10 to 1,000 nm.

(2) The fiber-reinforced polyamide resin composition molded article according to (1), wherein the polyamide resin (B1) contained in the polyamide resin composition (B) forms a continuous phase, the resin (B2) forms a dispersed phase, and fine particles with a diameter of 1 to 100 nm composed of the compound (B3) are contained in the dispersed phase.

(3) The fiber-reinforced polyamide resin composition molded article according to (2), wherein a ratio of an area of the fine particles composed of the compound (B3) occupied in an area of the particles composed of the resin (B2) is 20% or more.

(4) The fiber-reinforced polyamide resin composition molded article according to any one of (1) to (3), wherein the resin (B2) is a resin having at least one reactive functional group selected from an amino group, a carboxyl group, a metal salt of a carboxyl group, an epoxy group, an acid anhydride group and an oxazoline group.

(5) The fiber-reinforced polyamide resin composition molded article according to any one of (1) to (4), wherein the resin (B2) is a polyolefin resin.

(6) The fiber-reinforced polyamide resin composition molded article according to any one of (1) to (5), wherein the reinforcing fibers (A) contain carbon fibers (A1) and organic fibers (A2), and contain the carbon fibers (A1) at 50 to 99 parts by weight and the organic fibers (A2) at 1 to 50 parts by weight with respect to a total of 100 parts by weight of the carbon fibers (A1) and the organic fibers (A2).

(7) The fiber-reinforced polyamide resin composition molded article according to (6), wherein a weight average fiber length (Lwa2) of the organic fibers (A2) is 3 to 7 mm.

(8) The fiber-reinforced polyamide resin composition molded article according to any one of (1) to (7), wherein the polyamide resin (B1) is a mixture of a polyamide resin (B1a) selected from polyamide 6 and polyamide 66, and one or more polyamide resins (B1b) selected from the group consisting of polyamide 610, polyamide 612, polyamide 11, polyamide 12, polyamide 1010, polyamide 1012, and polyamide 9T, and a copolymerized polyamide containing at least one of these polyamides as a constituent component.

(9) The fiber-reinforced polyamide resin composition molded article according to (8), wherein the polyamide resin (B1) is a mixture of polyamide 6 resin and polyamide 610 resin.

(10) The fiber-reinforced polyamide resin composition molded article according to (8) or (9), wherein a water absorption rate when left in an environment of 80° C. and 95% RH for 24 hours is 3.0% or less.

(11) The fiber-reinforced polyamide resin composition molded article according to any one of (6) to (10), wherein the organic fibers (A2) are at least one selected from the group consisting of liquid crystal polyester fibers, polyarylene sulfide fibers and fluorine fibers.

Since the fiber-reinforced polyamide resin composition molded article contains reinforcing fibers and polyamide resin composition, it has a high reinforcing effect and an excellent impact resistance. Moreover, since the fiber-reinforced polyamide resin composition molded article contains a specific ammonium salt, it is excellent also in flowability and fiber dispersibility during molding of the molded article, and in mechanical properties. Furthermore, the use of specific polyamide resin mixtures makes it possible to obtain even better fiber dispersibility and stiffness upon water absorption of molded articles.

Such a fiber-reinforced polyamide resin composition molded article is extremely useful for electrical/electronic equipment, home appliances, housings, parts for automobiles, parts for sports applications and the like. As electrical/electronic equipment housings and parts, it is useful for electronic equipment housings of computers, televisions, video players, DVD players, cameras, audio equipment, and the like, and for electronic component applications represented by connectors, speakers, microphones, headphones, small motors, computer-related parts and the like. As home appliances, exemplified are VTR parts, TV parts, irons, hair dryers, rice cooker parts, microwave oven parts, audio parts, audiovisual equipment parts such as laser discs (registered trademark), compact discs, and DVDs, lighting parts, refrigerator parts, air conditioner parts, typewriter parts, word processor parts and the like. Further, as optical equipment and precision machinery related parts, exemplified are office computer related parts, telephone set related parts, facsimile related parts, copier related parts, binoculars, cameras, clocks and the like.

As automobile parts and vehicle-related parts, exemplified are door pads, pillars, console boxes, various motor housings, roof rails, fenders, garnishes, bumpers, door panels, roof panels, hood panels, trunk lids, door mirror stays, spoilers, hood louvers, wheels covers, wheel caps, grille apron cover frames, lamp bezels, door handles, door moldings, rear finishers, wipers and the like. Further, the molded article is also suitable as sporting goods, it is suitably used for golf-related goods such as golf clubs, shafts, grips, and golf balls, racket sports-related goods such as tennis rackets, tennis balls, badminton rackets and their guts, and badminton shuttlecocks, body protection goods for sports such as masks for American football, baseball, softball, helmets, chest pads, elbow pads, and knee pads, shoe-related goods such as sole materials for sports shoes, fishing-related goods such as fishing rods, reels, lures, summer sports-related goods such as surfing, winter sports-related goods such as skis and snowboards, and other indoor and outdoor sports-related goods.

EXPLANATION OF SYMBOLS

Figure 1:
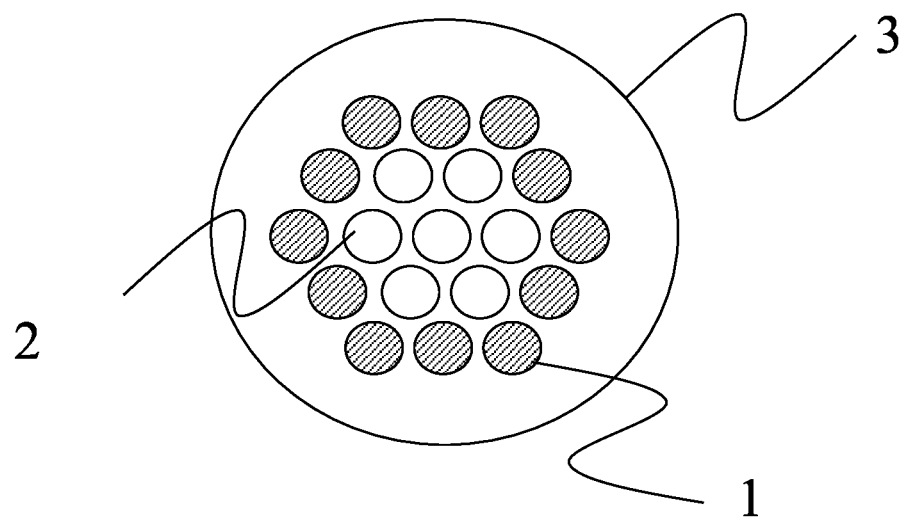
FIG. 1 is a schematic diagram showing a configuration in which carbon fibers (A1) enclose organic fibers (A2) in a cross section of a molding material of a fiber-reinforced polyamide resin composition molded article.

1: carbon fibers (A1)
2: organic fibers (A2)

3: polyamide resin composition (B) and ammonium salt (C)

4: component 9D)

DETAILED DESCRIPTION

Hereinafter, our molded articles will be explained in detail together with examples.

We provide a fiber-reinforced polyamide resin composition molded article containing reinforcing fibers (A), a polyamide resin composition (B), and an ammonium salt (C) composed of an aliphatic dicarboxylic acid having 6 to 12 carbon atoms and ammonia, in which with respect to a total of 100 parts by weight of the reinforcing fibers (A), the polyamide resin composition (B), and the ammonium salt (C) composed of an aliphatic dicarboxylic acid having 6 to 12 carbon atoms and ammonia, it contains the reinforcing fibers (A) at 5 to 50 parts by weight, the polyamide resin composition (B) at 40 to 94.9 parts by weight, and the ammonium salt (C) composed of aliphatic dicarboxylic acid having 6 to 12 carbon atoms and ammonia at 0.1 to 10 parts by weight, the weight average fiber length (Lwa1) of the reinforcing fibers (A) in a fiber-reinforced polyamide resin composition molded article is 0.4 mm or more and 7.0 mm or less, the polyamide resin composition (B) comprises a polyamide resin (B1), a resin (B2) having a reactive functional group, and a compound (B3) produced by a reaction of the resin (B1) and the resin (B2), and the resin (B2) having a reactive functional group is in a state of being dispersed in a form of particles with a number average particle diameter of 10 to 1,000 nm.

First, the fiber-reinforced polyamide resin composition molded article will be described in detail.

Reinforcing Fibers (A)

The reinforcing fibers (A) can improve the mechanical properties as a molded article by their fiber reinforcing effect for the polyamide resin composition (B). Further, when the reinforcing fibers (A) have a peculiar property such as an electrical conductivity or a thermal conductivity, it is possible to impart such a property to the molded article, which cannot be achieved with the polyamide resin composition (B) alone. Further, for the purpose of imparting an electrical conductivity, reinforcing fibers coated with a metal such as nickel, copper or ytterbium are also preferably used.

As the reinforcing fibers, although not particularly restricted, carbon fibers, organic fibers, glass fibers and metal fibers can be exemplified. Among them, carbon fibers are more preferably used to improve mechanical properties. As carbon fibers, exemplified are PAN (polyacrylonitrile)-based carbon fibers, pitch-based carbon fibers, rayon-based carbon fibers, cellulose-based carbon fibers, vapor growth-based carbon fibers, and graphitized fibers thereof. When an impact property is intended to be more improved, it is preferred to use them together with organic fibers, which will be described later.

For the carbon fibers, it is preferred that the surface oxygen ratio [O/C], which is a ratio of the numbers of oxygen (O) and carbon (C) atoms on the surface of the fiber measured by X-ray photoelectron spectroscopy, is 0.05 to 0.5. When the surface oxygen ratio is 0.05 or more, it is possible to secure a sufficient amount of functional groups on the carbon fiber surface and obtain stronger adhesiveness to the polyamide resin composition (B), and therefore, the flexural strength and tensile strength of the molded article are more improved. The surface oxygen ratio is more preferably 0.1 or more. Further, the upper limit of the surface oxygen ratio is more preferably 0.3 or less from the balance between the handleability of the carbon fibers and the productivity.

The surface oxygen ratio of carbon fiber is determined by X-ray photoelectron spectroscopy according to the following procedure. First, when a sizing agent or the like adheres to the carbon fiber surface, the sizing agent or the like is removed with a solvent. After cutting the carbon fiber to 20 mm and arranging it on a copper sample support table, using AlKα1,2 as an X-ray source, the inside of a sample chamber is maintained at $1 \times 10^{-8}$ Torr. The kinetic energy value (K.E.) of the main peak of $C_{1s}$ is adjusted to 1202 eV as a correction value for the peak associated with electrification during measurement. The $C_{1s}$ peak area is determined as K.E., by drawing a straight baseline in the range of 1191 to 1205 eV. The $O_{1s}$ peak area is determined as K.E., by drawing a straight baseline in the range of 947 to 959 eV.

The surface oxygen ratio [O/C] is calculated as an atomic number ratio from the ratio of the $O_{1s}$ peak area and the $C_{1s}$ peak area using a device-specific sensitivity correction value. Model ES-200 supplied by Kokusai Denki Co., Ltd. is used as the X-ray photoelectron spectrometer, and the sensitivity correction value is set to 1.74. Although the average fiber diameter of the carbon fibers is not particularly limited, it is preferably 1 to 20 μm, more preferably 3 to 15 μm, from the viewpoint of the mechanical properties and surface appearance of a molded article.

For the purpose of improving the adhesiveness between the carbon fibers and the polyamide resin composition (B) or the like, the carbon fibers may be surface-treated. As the method for the surface treatment, for example, electrolytic treatment, ozone treatment, ultraviolet treatment and the like can be exemplified.

A sizing agent may be provided to the carbon fibers for the purpose of preventing fluffing of the carbon fibers and improving adhesiveness between the carbon fibers and the polyamide resin composition (B) and the like. By providing a sizing agent, surface properties such as functional groups on the carbon fiber surface can be improved, and adhesiveness and mechanical properties (particularly impact strength) of a molded article can be improved.

As the sizing agent, for example, exemplified are an epoxy resin, a phenol resin, a polyethylene glycol, a polyurethane, a polyester, an emulsifier, a surfactant, and the like. 2 or more types of these may be used. The sizing agent is preferably water soluble or water dispersible. An epoxy resin with an excellent wettability with carbon fibers is preferred, and a polyfunctional epoxy resin is more preferred.

As the polyfunctional epoxy resin, exemplified are a bisphenol A type epoxy resin, a bisphenol F type epoxy resin, an aliphatic epoxy resin, a phenol novolac type epoxy resin, and the like. Among them, an aliphatic epoxy resin is preferable because it easily exhibits adhesiveness with the polyamide resin composition (B). Since an aliphatic epoxy resin has a flexible skeleton, it tends to have a structure with a high toughness even when the crosslinking density is high. Further, when the aliphatic epoxy resin is present between the carbon fibers and the polyamide resin composition, since it is realized to be flexible and to be difficult to be peeled off, the strength of the molded article can be further improved.

As the polyfunctional aliphatic epoxy resin, for example, a diglycidyl ether compound, a polyglycidyl ether compound and the like can be exemplified. As the diglycidyl ether compound, exemplified are an ethylene glycol diglycidyl ether, polyethylene glycol diglycidyl ethers, a propylene glycol diglycidyl ether, polypropylene glycol diglycidyl ethers, a 1,4-butanediol diglycidyl ether, a neopentyl glycol diglycidyl ether, polytetramethylene glycol diglycidyl ethers, polyalkylene glycol diglycidyl ethers, and the like. Further, as the polyglycidyl ether compound, exemplified are a glycerol polyglycidyl ether, a diglycerol polyglycidyl ether, polyglycerol polyglycidyl ethers, sorbitol polyglycidyl ethers, arabitol polyglycidyl ethers, trimethylolpropane polyglycidyl ethers, trimethylolpropane glycidyl ethers, pentaerythritol polyglycidyl ethers, polyglycidyl ethers of aliphatic polyhydric alcohols and the like.

Among the above-described aliphatic epoxy resins, trifunctional or higher aliphatic epoxy resins are preferred, and aliphatic polyglycidyl ether compounds having 3 or more highly reactive glycidyl groups are more preferred. The aliphatic polyglycidyl ether compound has a good balance of flexibility, crosslinking density, and compatibility with the polyamide resin composition (B), and can further improve adhesiveness. Among these, glycerol polyglycidyl ether, diglycerol polyglycidyl ether, polyglycerol polyglycidyl ethers, polyethylene glycol glycidyl ethers, and polypropylene glycol glycidyl ethers are more preferable.

The adhesion amount of the sizing agent is preferably 0.01 to 10% by weight relative to the total 100% by weight of the sizing agent and the carbon fibers. When the adhesion amount of the sizing agent is 0.01% by weight or more, the adhesiveness with the polyamide resin composition (B) can be further improved. The adhesion amount of the sizing agent is more preferably 0.05% by weight or more, further preferably 0.1% by weight or more. On the other hand, if the adhesion amount of the sizing agent is 10% by weight or less, the physical properties of the polyamide resin composition (B) can be maintained at a higher level. The adhesion amount of the sizing agent is more preferably 5% by weight or less, further preferably 2% by weight or less.

Organic Fibers (A2)

In the fiber-reinforced polyamide resin composition molded article, the aforementioned reinforcing fibers (A) may contain the aforementioned carbon fibers (A1) and organic fibers (A2). Because the carbon fiber (A1) is rigid and brittle, it is difficult to get entangled and easy to break. On the other hand, since the organic fiber (A2) has a flexibility, it is less likely to break during molding and tends to remain in the molded article while maintaining a long fiber length. Therefore, by containing the organic fiber (A2) flexible and hard to break, the impact property of the molded article can be greatly improved.

Concretely, by setting the fiber length of the organic fibers (A2) remaining in the molded article (in other words, the weight average fiber length (Lwa2) in the molded article) to 3 mm or more and 7 mm or less, a higher impact property can be given to the molded article.

The organic fibers (A2) can be appropriately selected within a range that does not significantly degrade the mechanical properties of the molded article. For example, can be exemplified fibers obtained by spinning resins such as polyolefin-based resins such as polyethylene and polypropylene, polyamide-based resins such as nylon 6, nylon 66, and aromatic polyamides, polyester-based resins such as polyethylene terephthalate and polybutylene terephthalate, fluorine-based resins such as polytetrafluoroethylene, perfluoroethylene/propene copolymer, ethylene/tetrafluoroethylene copolymer, liquid crystal polymers such as liquid crystal polyesters and liquid crystal polyester amides, polyarylene sulfides such as polyether ketones, polyether sulfones and polyphenylene sulfides and the like. 2 or more types of these can be used. It is preferable to appropriately select and use from among these organic fibers (A2). In particular, the melting temperature of the organic fiber (A2) is preferably 30 to 150° C. higher than the molding temperature (melting temperature) of the polyamide resin composition (B), more preferably 50 to 100° C. higher. Alternatively, since the organic fibers (A2) using a resin incompatible with the polyamide resin composition (B) exist in the molded article while maintaining their fibrous state, the impact resistance of the molded article can be further improved, and such organic fibers (A2) are preferred. As the organic fibers (A2) having a high melting temperature, polyphenylene sulfide resin fibers, fluoro resin fibers, liquid crystal polyester fibers and the like can be exemplified. As the organic fibers (A2), it is preferred to use at least one kind of fibers selected from the group consisting of these.

The single fiber fineness of the organic fibers (A2) is preferably 0.1 to 50 dtex. 3 dtex or more is more preferable, and 6 dtex or more is further preferable. By setting the single fiber fineness within the range described above, because it becomes resistant to fiber shearing during molding, the fiber length in the molded article tends to remain long and the impact strength of the molded article can be increased and, therefore, such a condition is preferred.

The fiber strength of the organic fibers (A2) can be determined by a known single yarn tensile test. The fiber strength of the organic fibers (A2) is determined by performing a tensile test in a room under standard conditions (20° C., 65% RH) under the conditions of a gripping distance of 250 mm and a tensile speed of 300 mm/min, and calculating by dividing the load at fiber breakage by the single fiber fineness. The single fiber fineness represents the thickness of a yarn that exhibits a weight of 1 g with a length of 10,000 m, and the single fiber fineness of the organic fibers (A2) can be determined by a known fiber fineness measurement (for example, JIS L 10132010).

The fiber strength is preferably 4 cN/dtex or more. If it is less than 4 cN/dtex, particularly the impact property of molded articles decreases. It is more preferably over 4 cN/dtex, further preferably 5 cN/dtex or more, and still further preferably 6 cN/dtex or more. Further, the fiber initial elastic modulus can be calculated from the initial slope in the stress-strain curve diagram obtained from the above-described fiber strength.

The fiber strength is preferably 50 cN/dtex or less, more preferably 40 cN/dtex or less, further preferably 30 cN/dtex or less. If the fiber strength exceeds 50 cN/dtex, the cutting of the fibers becomes difficult and the productivity of the molding material decreases, which is not preferred.

The density of the organic fibers (A2) can be determined by a known density measurement (for example, JIS L 10152010).

The content of the organic fibers (A2) in the molded article is preferably 1 to 50 parts by weight with respect to the total 100 parts by weight of the carbon fibers (A1) and the organic fibers (A2). If the content of the organic fibers (A2) is less than 1 part by weight, the impact property of the molded article decreases. The content of the organic fibers (A2) is more preferably 5 parts by weight or more, further preferably 10 parts by weight or more, and still further preferably 20 parts by weight or more. On the other hand, when the content of the organic fibers (A2) exceeds 50 parts by weight, the entanglement of the fibers with each other increases, the dispersibility of the organic fibers (A2) in the molded article decreases, and the impact property of the molded article is often caused to be decreased. The content of organic fibers (A2) is preferably 40 parts by weight or less, more preferably 30 parts by weight or less. When the reinforcing fibers (A) of the fiber-reinforced polyamide resin composition molded article contain the carbon fibers (A1) and the organic fibers (A2), the content of the carbon fibers (A1) is preferably 50 to 99 parts by weight with respect to 100 parts by weight in total of the carbon fibers (A1) and organic fibers (A2). When the content of the carbon fibers (A1) is less than 50 parts by weight, it is difficult to obtain high mechanical properties of the molded article.

Weight Average Fiber Length

In the fiber-reinforced polyamide resin composition molded article, the weight average fiber length (Lwa1) of the reinforcing fibers (A) in the molded article is 0.4 mm or more and 7.0 mm or less. When the weight average fiber length (Lwa1) of the reinforcing fibers (A) is less than 0.4 mm, the effect of improving the flexural strength and impact property of the molded article is difficult to be exhibited. Lwa1 is more preferably 0.5 mm or more, and further preferably 0.7 mm or more. On the other hand, when the weight average fiber length (Lwa1) exceeds 7.0 mm, the entanglement between the single fibers of the reinforcing fibers (A) becomes difficult to be suppressed, and fiber breakage occurs, and therefore, the effect of improving the flexural strength of the molded article is difficult to be exhibited. Lwa1 is more preferably 4 mm or less.

Further, when the reinforcing fibers (A) contain the carbon fibers (A1) and the organic fibers (A2), the weight average fiber length (Lwa2) of the organic fibers (A2) in the molded article is preferably 3 mm or more and 7 mm or less. When the weight average fiber length (Lwa2) of the organic fibers (A2) is less than 3 mm, the reinforcing effect of the organic fibers (A2) on the molded article is difficult to be exhibited, and the impact property is poor. Lwa2 is more preferably 4 mm or more. On the other hand, when the weight average fiber length (Lwa2) exceeds 7 mm, the entanglement between the single yarns of the organic fibers (A2) is difficult to be suppressed, and fiber breakage occurs, and therefore, the impact property of the molded article is poor. Lwa2 is more preferably 6 mm or less. By setting the weight average fiber length (Lwa2) of the organic fibers (A2) within the above-described range, the entanglement of the single fibers to each other of the organic fibers (A2) is suppressed, and the organic fibers (A2) exist in a curved state. As a result, when the molded article is destroyed, the cracks do not propagate only in one direction, and more impact energy can be absorbed, thereby improving the impact strength of the molded article.

The "weight average fiber length" does not simply take the number average, but applies the calculation method of the weight average molecular weight to the calculation of the fiber length, and it indicates an average fiber length calculated from the following equation considering the contribution of the fiber length. The weight average fiber length of each of carbon fibers (A1) and the organic fibers (A2) can be calculated by the following equation:

Weight average fiber length=$\Sigma(Mi^2 \times Ni)/\Sigma(Mi \times Ni)$

Mi: fiber length (mm)
Ni: number of reinforcing fibers of fiber length Mi.

The measurement of the above-described weight average fiber length can be achieved, for example, by a method of heating a test piece with ab arbitrary size cut from an ISO dumbbell test piece on a hot stage set to a temperature at which the organic fibers (A2) do not melt and only the polyamide resin composition (B) melts (for example, 200 to 300° C.) at a state sandwiched between cover glasses, and making it in a form of a film to uniformly disperse it without applying excessive pressure, thereby forming a film in which the fibers are uniformly dispersed, or by a method of putting a test piece with ab arbitrary size cut from an ISO dumbbell test piece into an organic solvent in which the organic fibers (A2) do not dissolve and only the polyamide resin composition (B) dissolves, and as needed after heating and dissolving it, filtrating the organic solution to obtain an observation sample in which the fibers are uniformly dispersed. The sample obtained by the above-described method was observed with an optical microscope (50 to 200 times), the fiber lengths of 1,000 randomly selected carbon fibers (A1) and organic fibers (A2) are measured, and the weight average fiber length (Lwa1) of the carbon fibers (A1) and the weight average fiber length (Lwa2) of the organic fibers (A2) are calculated from the above-described equations.

The weight average fiber lengths of the carbon fibers (A1) and organic fibers (A2) in a molded article can be adjusted, for example, by molding conditions and the like. As such molding conditions, for example, in injection molding, exemplified are pressure conditions such as back pressure and holding pressure, time conditions such as injection time and pressure holding time, and temperature conditions such as cylinder temperature and mold temperature. Concretely, by utilizing the fact that organic fibers (A2) are more flexible and less likely to break than carbon fibers (A1), the shear force inside the cylinder is appropriately increased by appropriately increasing the pressure conditions such as back pressure, thereby shortening the average fiber length of carbon fibers (A1) compared to organic fibers (A2). Further, the injection time may be appropriately shortened to appropriately increase the shear force at the time of injection, thereby shortening the average fiber length of carbon fibers (A1) as compared with that of organic fibers (A2). Furthermore, if the temperature such as the cylinder temperature, the mold temperature or the like is appropriately lowered, because the viscosity of the flowing resin increases and the shear force can be increased, by such a method, the average fiber length of carbon fibers (A1) can also be shortened as compared with that of organic fibers (A2). By appropriately changing the conditions as described above, the average fiber lengths of the carbon fibers (A1) and the organic fibers (A2) in the molded article can be controlled in desired ranges. Among them, it is particularly effective to adjust the shear force by controlling the back pressure condition and the injection time. However, if the shear force acting on the fibers is increased more than necessary, the average fiber length of not only the carbon fibers (A1) but also the organic fibers (A2) will be shortened, so care must be taken.

Polyamide Resin Composition (B)

The polyamide resin composition comprises a polyamide resin (B1), a resin (B2) having a reactive functional group, and a compound (B3) produced by the reaction of (B1) and (B2).

Polyamide Resin (B1)

The above-described polyamide resin (B1) is a resin composed of a polymer having an amide bond, and is mainly composed of an amino acid, a lactam or a diamine and a dicarboxylic acid. As typical examples of raw materials thereof, exemplified are amino acids such as 6-aminocaproic acid, 11-aminoundecanoic acid, 12-aminododecanoic acid, and para-aminomethyl benzoic acid; lactams such as ε-caprolactam and ω-laurolactam; aliphatic, cycloaliphatic or aromatic diamines such as tetramethylene diamine, pentamethylene diamine, hexamethylene diamine, 2-methylpentamethylene diamine, undecamethylene diamine, dodecamethylene diamine, 2,2,4-/2,4,4-trimethylhexamethylene diamine, 5-methylnonamethylene diamine, meta xylylene diamine, para xylylene diamine, 1,3-bis(aminomethyl) cyclohexane, 1,4-bis(aminomethyl) cyclohexane, 1-amino-3-aminomethyl-3,5,5-trimethyl cyclohexane, bis (4-aminocyclohexyl) methane, bis(3-methyl-4-aminocyclohexyl) methane, 2,2-bis(4-aminocyclohexyl) propane, bis (aminopropyl) piperazine, and aminoethyl piperazine; and aliphatic, alicyclic or aromatic dicarboxylic acids such as adipic acid, spelic acid, azelaic acid, sebacic acid, dodecanedioic acid, terephthalic acid, isophthalic acid, 2-chloroterephthalic acid, 2-methyl terephthalic acid, 5-methyl isophthalic acid, 5-sodium sulfoisophthalic acid, hexahydro terephthalic acid and hexahydro isophthalic acid. Polyamide homopolymers or copolymers derived from these raw materials can be used singly or in a form of mixture.

As concrete examples of particularly useful polyamides, exemplified are polycaproamide (nylon 6), polyhexamethylene adipamide (nylon 66), polypentamethylene adipamide (nylon 56), polytetramethylene adipamide (nylon 46), polyhexamethylene sebacamide (nylon 610), polypentamethylene sebacamide (nylon 510), polyhexamethylene dodecamide (nylon 612), polyundecaneamide (nylon 11), polydodecanamide (nylon 12), polycaproamide/polyhexamethylene adipamide copolymer (nylon 6/66), polycaproamide/polyhexamethylene terephthalamide copolymer (nylon 6/6T), polyhexamethylene adipamide/polyhexamethylene terephthalamide copolymer (nylon 66/6T), polyhexamethylene adipamide/polyhexamethylene isophthalamide copolymer (nylon 66/6I), polyhexamethylene adipamide/polyhexamethylene isophthalamide/polycaproamide copolymer (nylon 66/6I/6), polyhexamethylene terephthalamide/polyhexamethylene isophthalamide copolymer (nylon 6T/6I), polyhexamethylene terephthalamide/polydodecanamide copolymer (nylon 6T/12), polyhexamethylene adipamide/polyhexamethylene terephthalamide/polyhexamethylene isophthalamide copolymer (nylon 66/6T/6I), polyxylylene adipamide (nylon XD6), polyhexamethylene terephthalamide/poly-2-methylpentamethylene terephthalamide copolymer (nylon 6T/M5T), polyhexamethylene terephthalamide/polypentamethylene terephthalamide copolymer (nylon 6T/5T), polynonamethylene terephthalamide (nylon 9T), and mixtures or copolymers thereof.

Particularly preferred are nylon 6, nylon 66, nylon 610, nylon 11, nylon 12, nylon 6/66, nylon 66/6T and nylon 6T/6I copolymers, and the like. Furthermore, it is practically suitable to use these polyamides as a mixture according to required properties such as moldability, heat resistance, toughness and surface properties. Among these, nylon 6, nylon 66, nylon 610, nylon 11 and nylon 12 are most preferred.

Further, it is preferred that the polyamide resin (B1) is constituted from a mixture comprises a polyamide resin (B1a) having polyamide 6 or polyamide 66 as a constituent component, polyamide 610, and one or more polyamide resins (B1b) selected from the group consisting of polyamide 610, polyamide 612, polyamide 11, polyamide 12, polyamide 1010, polyamide 1012, and polyamide 9T, and a copolymerized polyamide containing at least one of these polyamides as a constituent component. These polyamides are made into a mixture according to required properties such as moldability, heat resistance, toughness and surface properties. The polyamide resin (B1b) is a polyamide resin having a water absorption rate of 5% or less when left in an aquatic environment at 25° C. for 300 hours, and since the water absorption rate when the molded article is left in an environment of 80° C.×95% RH for 24 hours can be suppressed to 3.0% or less by appropriately adjusting the compounding ratio of the polyamide resins (B1a) and (B1b), the decrease in stiffness upon water absorption of the molded article can be suppressed. If the water absorption rate exceeds 3.0%, it is not preferable because the decrease in stiffness upon water absorption becomes large. The water absorption rate is more preferably 2.7% or less.

Further, it has been clarified that the fiber dispersibility is improved by selecting a polyamide resin (B1b) having an SP value between those of the resin (B1a) and a resin (B2) described later. Although this mechanism is presumed, it is considered because the polyamide resin (B1b) controls the SP values of the polyamide 6 resin (B1a) and the resin (B2) described later, by mixing the polyamide resin (B1b). Namely, it is presumed because, by the condition where the resin (B1b) is positioned between (B1a) and (B2) which are far apart in SP value, the compatibility with the carbon fibers (A1) and the organic fibers (A2) is further improved.

Among these combinations, it is preferable to select polyamide 6 resin as the resin (B1a) and polyamide 610 as the resin (B1b) from the viewpoint of water absorption rate and fiber dispersibility.

Although the degree of polymerization of these polyamides is not particularly restricted, the relative viscosity measured at 25° C. in a 98% concentrated sulfuric acid solution with a sample concentration of 0.01 g/ml of the polyamide resins is preferably 1.5 to 7.0, in particular, 1.8 to 5.0. If the relative viscosity is 1.5 or more, a higher impact resistance is given to the fiber-reinforced resin composition. Further, if the relative viscosity is 7.0 or less, the moldability is excellent.

Resin (B2) Having a Reactive Functional Group

Although the base resin of the resin (B2) having a reactive functional group is not particularly restricted, for example, it is selected from polyamide, polyester, polyphenylene sulfide, polycarbonate, polylactic acid, polyacetal, polysulfone, tetrafluoroethylene, polyether imide, polyamideimide, polyimide, polyether sulfone, polyether ketone, polythioether ketone, polyether ether ketone, polyethylene, polypropylene, styrene-based resins such as polystyrene and ABS, rubbery polymers, polyalkylene oxides and the like and at least one resin different from the aforementioned polyamide resin (B1) can be used. Among them, as the base resin for the resin (B2), resins selected from polyolefin resins such as polyethylene resins and polypropylene resins, styrene-based resins and rubbery polymers are more preferable from the viewpoint of easiness for introducing reactive functional groups, and further, rubbery polymers are more preferable from the viewpoint of imparting impact absorption.

The rubbery polymer is a polymer containing a polymer having a low glass transition temperature, and a part of intermolecular portions of which are restrained by covalent bonds, ionic bonds, Van der Waals forces, entanglement or the like. The glass transition temperature of the rubbery polymer is preferably 25° C. or lower. If the glass transition temperature exceeds 25° C., the impact resistance is poor, which is not preferable.

As the preferable examples of the rubbery polymers, for example, exemplified are random copolymers and block copolymers of polybutadiene, polyisoprene and styrene-butadiene, hydrogenated products of the block copolymers, diene-based rubbers such as acrylonitrile-butadiene copolymers and butadiene-isoprene copolymers. random and block copolymers of ethylene-propylene, random and block copolymers of ethylene-butene, copolymers of ethylene and α-olefins, ethylene-unsaturated carboxylic acid copolymers such as ethylene-acrylic acid copolymers and ethylene-methacrylic acid copolymers, ethylene-unsaturated carboxylic acid ester copolymers such as ethylene-acrylic acid esters and ethylene-methacrylic acid esters, ethylene-unsaturated carboxylic acid-unsaturated carboxylic acid metal salt copolymers, in which a part of the unsaturated carboxylic acid is a metal salt such as ethylene-acrylic acid-acrylic acid metal salt and ethylene-methacrylic acid-methacrylic acid metal salt, acrylic-based elastic polymers such as acrylic ester-butadiene copolymers, for example, butyl acrylate-butadiene copolymers, copolymers of ethylene and fatty acid vinyl such as ethylene-vinyl acetate, ethylene-propylene non-conjugated diene terpolymers such as ethylene-propylene-ethylidene norbornene copolymers and ethylene propylene-hexadiene copolymers, butylene-isoprene copolymers, chlorinated polyethylenes, and thermoplastic elastomers such as polyamide elastomers and polyester elastomers.

When used for the polyamide resin (B1), from the viewpoint capable of obtaining excellent impact strength, ethylene-unsaturated carboxylic acid ester copolymer or random copolymers and block copolymers of ethylene-propylene, random copolymers and block copolymers of ethylene-butene, and copolymers of ethylene and α-olefins are preferably used.

As the unsaturated carboxylic acid ester in the ethylene-unsaturated carboxylic acid ester copolymer, a (meth)acrylic acid ester is preferred. As the concrete examples of the unsaturated carboxylic acid esters, exemplified are (meth) acrylic acid esters such as methyl (meth)acrylate, ethyl (meth)acrylate, 2-ethylhexyl (meth)acrylate, and stearyl (meth)acrylate. "(Meth)acrylic acid" means "acrylic acid or methacrylic acid." Although the weight ratio of the ethylene component and the unsaturated carboxylic acid ester component in the copolymer is not particularly restricted, it is preferably in the range of 90/10 to 10/90, more preferably 85/15 to 15/85. Although the number average molecular weight of the ethylene-unsaturated carboxylic acid ester copolymer is not particularly restricted, it is preferably 1,000 to 70,000 from the viewpoint of flowability and mechanical properties.

Although the reactive functional group contained in the resin (B2) having a reactive functional group is not particularly restricted as long as it reacts with the functional group present in the polyamide resin (B1), it is preferably at least one selected from an amino group, a carboxyl group, carboxyl a metal salt of a carboxyl group, a hydroxyl group, an epoxy group, an acid anhydride group, an isocyanate group, a mercapto group, an oxazoline group, a sulfonic acid group and the like. Among these, a group selected from an amino group, a carboxyl group, a metal salt of a carboxyl group, an epoxy group, an acid anhydride group and an oxazoline group has high reactivity and less side reactions such as decomposition and cross-linking, and thus is more preferably used.

When an acid anhydride group is introduced into a rubbery polymer, it can be carried out by a method of a known technology, and although it is not particularly restricted, for example, a method of copolymerizing an acid anhydride such as maleic anhydride, itaconic anhydride, endic anhydride, citraconic acid and 1-butene-3,4-dicarboxylic anhydride with a monomer which is a raw material of a rubbery polymer, a method of grafting an acid anhydride onto a rubbery polymer and the like can be used.

Further, when an epoxy group is introduced into a rubbery polymer, it can be carried out by a method of a known technology, and although it is not particularly restricted, for example, a method of copolymerizing a vinyl-based monomer having an epoxy group such as glycidyl acrylate, glycidyl methacrylate, a glycidyl ester compound of an α,β-unsaturated acid such as glycidyl ethacrylate and glycidyl itaconate with a monomer that is a raw material for a rubbery polymer, a method of polymerizing a rubbery polymer using an initiator for polymerization or a chain transfer agent, a method of grafting an epoxy compound onto a rubbery polymer and the like, can be used.

Further, when an oxazoline group is introduced into a rubbery polymer, it can be carried out by a method of a known technology, and although it is not particularly restricted, for example, a method of copolymerizing a vinyl-based monomer having an oxazoline group such as 2-isopropenyl-oxazoline, 2-vinyl-oxazoline, 2-acryloyl-oxazoline and 2-styryl-oxazoline with a monomer that is a raw material of a rubbery polymer and the like, can be used.

Although the number of functional groups per one molecular chain in the resin (B2) having a reactive functional group is not particularly restricted, usually it is preferably 1 to 10, and it is preferably 1 to 5 to reduce side reactions such as cross-linking The polyamide resin composition (B) comprises a polyamide resin (B1), a resin (B2) having a reactive functional group, and a compound (B3) produced by reacting (B1) and (B2). The polyamide resin composition (B) can be obtained by melt-kneading the polyamide resin (B1) and the resin (B2) having a reactive functional group. Further, since the resin (B2) has a reactive functional group, (B3) is produced by the reaction of (B1) and (B2) during melt-kneading of (B1) and (B2). The polyamide resin composition (B) is obtained in which the resin (B1) forms a matrix phase as a continuous layer and the resin (B2) is dispersed as a dispersed phase in the form of particles. The structure of the particles composed of the resin (B2) is highly controlled and greatly contributes to improvement of the impact resistance. The polyamide resin (B1) and the component (B) are mixed to form a matrix resin, and the resin (B2) is contained in the polyamide resin composition (B) in which the resin (B2) is dispersed in the matrix resin in the form of particles. The number average particle diameter of the particles comprising the resin (B2) should be 10 to 1,000 nm. If the number average particle diameter of the particles is less than 10 nm, the desired impact resistance is not exhibited, and if it exceeds 1,000 nm, the desired stiffness is lowered, which is undesirable. A fiber-reinforced polyamide resin composition molded article with an excellent balance between stiffness and impact resistance can be obtained by improving the impact resistance with a small amount of particles composed of the resin (B2) whose structure is highly controlled.

Furthermore, the fiber-reinforced polyamide resin composition molded article preferably contains a compound (B3) having an average particle diameter of 1 to 100 nm produced by the reaction of the polyamide resin (B1) and the resin (B2) in the particles comprising the resin (B2). Furthermore, the area ratio of the compound (B3) produced by the reaction of the components (B1) and (B2) in the particles comprising the resin (B2) is preferably 20% or more. Even if the compounding amount of the resin (B2) that forms the dispersed phase is small, by controlling the structure in the dispersed phase as described above, a fiber-reinforced polyamide resin composition molded article with an excellent balance between stiffness and impact resistance can be obtained.

A known technology can be applied to the morphology observation method. For example, a method can be exemplified for cutting the central part of a test piece in the cross-sectional direction at a size of 1 to 2 mm square, after dying the resin (B2) having a reactive functional group with ruthenium tetroxide, preparing a ultra-thin piece having a thickness of 0.1 μm or less (about 80 nm) using an ultramicrotome, and observing the resin portions (portions excluding the reinforcing fibers) composed of the polyamide resin (B1), the resin (B2) and the compound (B3) of the cut piece with a transmission electron microscope. The number average particle diameter (Xn) of the particles is determined by randomly extracting 400 or more particles from the obtained image and analyzing the particle diameter distribution using an image analysis software "Scion Image" supplied by Scion Corporation, and calculating by the following equation:

Number average particle diameter$(Xn) = \Sigma(Xi \times ni)/\Sigma ni$

Xi: particle diameter
ni: number of particles corresponding to the particle diameter (Xi)
(i=1, 2, 3, . . . , n).

The number average particle diameter of the particles comprising the resin (B2) can be determined from an image magnified 10,000 times. Further, the number average particle diameter of the compound (B3) produced by the reaction of the polyamide resin (B1) and the resin (B2) contained in the particles comprising the resin (B2) can be determined from an image magnified 35,000 times.

The area ratio occupied by the compound (B3) in the particles comprising the resin (B2) is determined by using a transmission electron microscope and analyzing the area of the resin (B2) and the area occupied by the compound (B3), respectively, from an image magnified 35,000 times using the image analysis software "Scion Image" supplied by Scion Corporation, and calculating by the following equation:

$Sn = Sp/(Sa2 + Sp)$

Sn: area ratio (Sn) occupied by the compound (B3) in the particles comprising the resin (B2)
Sa2: area occupied by the resin (B2)
Sp: area occupied by the compound (B3).

The method of producing the polyamide resin composition (B) is not particularly restricted, but, for example, the following method is effective.

As one method of producing the polyamide resin composition (B), a method can be exemplified for putting the polyamide resin (B1) and the resin (B2) having a reactive functional group into a twin-screw extruder having a ratio L/D0 of screw length L to screw diameter D0 of 50 or more and having multiple full flight zones and kneading zones, and melt-kneading under conditions satisfying Pkmax≥Pfmin+0.3, where Pkmax (MPa) is the maximum resin pressure among the resin pressures in the kneading zones in the screw, and Pfmin (MPa) is the minimum resin pressure among the resin pressures in the full flight zones in the screw.

From the viewpoint of improving kneadability and reactivity, the value of L/D0 is more preferably 60 to 200, further preferably 80-200. Further, when a twin-screw extruder with an L/D0 of less than 50 is used, it is preferred to increase the value of L/D0 on calculation considered with passing of the resin composition to 50 or more by performing kneading a plurality of times. L/D0 is a value dividing the screw length L by the screw diameter DO. The screw length is a length from an upstream end of the screw segment positioned at the screw root (feed port) where the polyamide resin (B1) and the resin (B2) having a reactive functional group are supplied, up to the screw tip. The screw of the twin-screw extruder is composed of a combination of screw segments such as full flights and kneading discs, which have different lengths and shape characteristics. Further, in an extruder, the side to which raw materials are supplied may be referred to as the upstream side, and the side to which the molten resin is discharged may be referred to as the downstream side.

When the polyamide resin composition (B) is produced using a twin-screw extruder with an L/D0 of 50 or more, from the viewpoint of improving kneadability and reactivity, the screw of the twin-screw extruder preferably has full-flight zones and kneading zones at multiple locations. A full flight zone is composed of one or more full flights, and a kneading zone is composed of one or more kneading discs.

When the maximum resin pressure in the kneading zone among the resin pressures indicated by the resin pressure gauges installed at multiple locations in the kneading zone is referred to as Pkmax (MPa) and the minimum resin pressure in the full flight zone among the resin pressures indicated by the resin pressure gauges installed at multiple locations in the full flight zone is referred to as Pfmin (MPa), it is preferred to produce under a condition where the value of Pkmax is (Pfmin+0.3) or more, and more preferred to produce under a condition where the value of Pkmax is (Pfmin+0.5) or more.

A kneading zone composed of one or more kneading discs is more superior in kneadability and reactivity of molten resin than those in a full flight zone composed of one or more full flights. By filling the kneading zone with molten resin, kneadability and reactivity are dramatically improved. One index that indicates the filling state of the molten resin is a value of the resin pressure, and the higher the resin pressure is, the more the molten resin is filled, that becomes one standard. Namely, in using a twin-screw extruder, the reaction can be effectively accelerated by increasing the resin pressure in the kneading zone to a certain extent higher than the resin pressure in the full flight zone.

Although the method of increasing the resin pressure in the kneading zone is not particularly restricted, can be preferably used a method of introducing a reverse screw zone that has an effect of pushing back the molten resin to the upstream side or a seal ring zone that has an effect of accumulating the molten resin at a position between the kneading zones or on a downstream side of the kneading zone. The reverse screw zone and the seal ring zone consist of one or more reverse screws and one or more seal rings, and they can be combined.

For example, when a reverse screw zone is introduced at a position between kneading zones or downstream of the kneading zone, when the length of the reverse screw zone is referred to as Lr, it is preferred that the reverse screw zone has a length of Lr/D0=0.1 to 10, from the viewpoint of kneadability and reactivity. The length Lr/D0 of the reverse screw zone is more preferably 0.2 to 8, further preferably 0.3 to 6. When a plurality of reverse screw zones are provided, each reverse screw zone preferably satisfies the above range of Lr/DO. The length Lr of the reverse screw zone is referred to as a distance between a vertical line from an upstream end of the most upstream reverse screw that constitutes the reverse screw zone to a screw axis center line, and a vertical line from a downstream end of the most downstream reverse screw that constitutes the reverse screw zone to the screw axis center line.

The polyamide resin composition (B) is produced using a twin-screw extruder with an L/D0 of 50 or more, the extrusion amount is preferably 0.01 kg/h or more per 1 rpm of the screw, more preferably 0.05 kg/h to 1 kg/h, further preferably 0.08 to 0.5 kg/h, most preferably 0.1 to 0.3 kg/h. The extrusion amount means a weight (kg) per one hour of the melt-kneaded material discharged from the extruder.

The above-described preferred numerical range with respect to the extrusion amount of the twin-screw extruder is based on the standard of the extrusion amount of a twin-screw extruder with a screw diameter of 41 mm. When the screw diameter is greatly different, for example, in using a twin-screw extruder with a diameter of less than 30 mm or more than 50 mm, the extrusion amount can be read as a value decreased or increased preferably according to the 2.5th power law or the 3rd power law, more preferably according to the 2.5th power law, relative to the screw diameter ratio before and after scale-down or scale-up.

For example, in using a twin-screw extruder with a screw diameter of 20 mm, assuming that the extrusion amount follows the 2.5th power law of the screw diameter ratio before and after scale down, the extrusion amount of the melt-kneaded product is preferably 0.0017 kg/h or more per screw rotational speed of 1 rpm, more preferably 0.0083 to 0.17 kg/h, further preferably 0.013 to 0.083 kg/h, most preferably 0.017 to 0.050 kg/h.

Further, in using a twin-screw extruder with a screw diameter of 100 mm, assuming that the extrusion amount follows the 2.5th power law of the screw diameter ratio before and after scale up, the extrusion amount of the melt-kneaded product is preferably 0.093 kg/h or more per screw rotational speed of 1 rpm, more preferably 0.46 to 9.29 kg/h, further preferably 0.74 to 4.65 kg/h, most preferably 0.93 to 2.79 kg/h.

Further, although the rotational speed of the screw is not particularly restricted, it is preferably 10 rpm or higher, more preferably 15 rpm or higher, and further preferably 20 rpm or higher.

The residence time in the twin-screw extruder is preferably 1 to 30 minutes, more preferably 1.5 to 25 minutes. Such a residence time is a value representing an average residence time from feeding raw materials to a twin-screw extruder until discharging. The residence time is determined as a time in a stable melt-kneading state in which an uncolored melt-kneaded material is adjusted at a predetermined extrusion amount, from the timing at which about 1 g of a colorant is charged together with the raw material from a position of the base of the screw to which the raw material is supplied, to the timing at which the charged material is extruded from the discharge port of the extruder and the degree of coloring of the extrudate due to the colorant becomes maximum.

In producing the polyamide resin composition (B) using a twin-screw extruder with an L/D0 of 50 or more, the screw of the twin-screw extruder is not particularly limited, and a screw of a completely intermeshing type, an incompletely intermeshing type or a non-meshing type can be used. A completely intermeshing type screw is preferred from the viewpoint of kneadability and reactivity. Further, the rotation direction of the screw may be any of the same direction and the opposite direction, but the same-direction rotation is preferable from the viewpoint of kneadability and reactivity. As the screw, a same-direction rotation completely intermeshing type is most preferable.

As the screw configuration of the twin-screw extruder, a combination of full flight and/or kneading discs is used, and a screw configuration that effectively imparts a shear field to the molten resin composition is preferred. Therefore, as described above, it is preferred that the screw of the twin-screw extruder has a plurality of kneading zones each composed of one or more kneading disks in the longitudinal direction. The total length of these kneading zones is preferably 5 to 50%, more preferably 10 to 40%, further preferably 15 to 30% of the total length of the screw.

When the length of each kneading zone in the screw of the twin-screw extruder is referred to as Lk, it is preferred that all kneading zones have a length of Lk/D0=0.2-10 from the viewpoint of kneadability and reactivity. The length Lk/D0 of each kneading zone is more preferably 0.3-9, further preferably 0.5-8. The length Lk of a kneading zone is defined as a distance between the vertical line from the upstream end of the most upstream kneading disk that constitutes the kneading zone to the screw axis center line, and the vertical line from the downstream end of the most downstream kneading disc that constitutes the kneading zone. Further, the kneading zone of the twin-screw extruder is preferably arranged over the entire area without being unevenly distributed at a specific position in the screw.

To remove reaction by-products or thermally degraded substances or the like, it is preferable to provide a vent vacuum zone and reduce the pressure to a gauge pressure of −0.07 MPa or less for melt-kneading, and more preferable to reduce the pressure to a gauge pressure of −0.08 MPa or less for melt-kneading. The gauge pressure indicates a pressure when the atmospheric pressure is referred to as zero, and the lower the pressure is, the higher the degree of vacuum and the higher the ability to remove volatile components is. When the gauge pressure in the vent vacuum zone exceeds −0.07 MPa, that is, when the degree of vacuum is low, the volatile components cannot be sufficiently removed and impurities remain in the polyamide resin composition (B), which is not preferable. By sufficiently removing volatile components in the vent vacuum zone, it becomes possible to reduce the amount of impurities in the melt-kneaded product. The number of vent vacuum zones is not particularly restricted, and it is preferred to install one to a plurality of them. Further, the position of the vent vacuum zone is not particularly restricted, but it is preferred to install at least one at a position before by a length of L/D0=0-10 from the sampling position because it is possible to effectively remove the volatile components.

The melt-kneading is preferably performed while controlling the maximum resin temperature to 180° C. to 330° C., and more preferably the melt-kneading is performed at 200° C. to 325° C. The term "maximum resin temperature" as used herein indicates the highest temperature among the temperatures measured by resin thermometers evenly installed at a plurality of locations in the extruder. If the maximum resin temperature is lower than 180° C., the reactivity between the polymers is low, and if it exceeds 330° C., thermal decomposition of the polymer proceeds.

When a twin-screw extruder is used, it is preferred to perform the melt-kneading at a condition of introducing an inert gas from the raw material charging port to suppress thermal deterioration. Nitrogen gas is preferred as the inert gas.

As the second method of producing the polyamide resin composition (B), a method of performing the melt-kneading while stretch-flowing the polyamide resin (B1) and the resin (B2) having a reactive functional group can be exemplified. In the stretch-flow kneading, because the dispersion efficiency is higher than that in the shear flow generally used in melt kneading, the reaction proceeds efficiently especially in alloying involving reactions such as reactive processing.

When the polyamide resin composition (B) is produced by melt-kneading with the stretch-flowing, melt-kneading using an extruder is preferably used, and as examples of the extruder, a single-screw extruder, a twin-screw extruder, and a multi-screw extruders having three or more screws can be exemplified. Among them, a single-screw extruder and a twin-screw extruder are preferably used, and a twin-screw extruder is particularly preferably used. Further, the screw of such a twin-screw extruder is not particularly restricted, and a completely intermeshing type screw, an incompletely intermeshing type screw, or a non-meshing type screw can be used. From the viewpoint of kneadability and reactivity, the completely intermeshing type is preferred. Furthermore, as the rotation direction of the screw, any of the same direction and different directions may be employed, but from the viewpoint of kneadability and reactivity, the same direction is preferred. The most preferable screw is one of the same-direction rotation completely intermeshing type.

To provide a stretch-flowing field suitable for reactive processing, the ratio of the total length of the stretch-flowing zones to the total length of the screw of the extruder is preferably 5 to 60%, more preferably 10 to 55%, further preferably 15 to 50%.

When the length of the stretch-flowing zone in the screw of the extruder is referred to as Lk and the screw diameter is referred to as DO, Lk/D0 is preferably 0.2 to 10 from the viewpoint of kneadability and reactivity. It is more preferably 0.3 to 9, further preferably 0.5 to 8. When a plurality of stretch-flowing zones are provided, each stretch-flowing zone preferably satisfies the above-described range of Lk/DO. Moreover, it is preferred that the stretch-flowing zones are arranged over the entire area in the screw without being unevenly distributed in a specific position.

As preferable screw configurations of the stretch-flowing zone, exemplified are a configuration which comprises a kneading disc, and which is a twist kneading disc in which the spiral angle θ of such a kneading disc, which is an angle between the top on the front end side of the disk and the top on the rear end side, is within the range of $0°<θ<90°$ in the half-rotation direction of the screw, a configuration which comprises a flight screw, and in which a resin path whose cross-sectional area is reduced from the tip side of the screw toward the rear end side is formed in the flight part of the flight screw, and a configuration in which a resin path through which a molten resin passes whose cross-sectional area is gradually reduced is formed.

It is preferred that the extrusion amount per 1 rpm of the screw is 0.01 kg/h or more. The extrusion amount is a weight (kg) extruded per one hour of the melt-kneaded material discharged from the extruder. If the extrusion amount per 1 rpm of the screw is less than 0.01 kg/h, the extrusion amount for the number of rotations is not sufficient, and the residence time in the extruder becomes too long, it causes a thermal deterioration, and it causes a problem in that the filling ratio of the resin inside the extruder becomes very small and sufficient kneading cannot be performed. Further, the rotational speed of the screw is not particularly restricted, but it is preferably 10 rpm or higher, more preferably 50 rpm or higher, and further preferably 80 rpm or higher. Further, the extrusion amount is preferably 0.1 kg/h or more, more preferably 0.15 kg/h or more, and further preferably 0.2 kg/h or more.

The residence time in the extruder is preferably 1 to 30 minutes, more preferably 1.5 to 28 minutes, further preferably 2 to 25 minutes. The residence time is a value representing the average residence time from the supply of the raw material to the extruder until it is discharged. The residence time is determined as a time in a stable melt-kneading state in which an uncolored melt-kneaded material is adjusted at a predetermined extrusion amount, from the timing at which about 1 g of a colorant is charged together with the raw material from a position of the base of the screw to which the raw material is supplied, to the timing at which the charged material is extruded from the discharge port of the extruder and the degree of coloring of the extrudate due to the colorant becomes maximum. If the residence time is less than 1 minute, the reaction time in the extruder is too short and the reaction is not sufficiently promoted, which is not preferable. If the residence time is longer than 30 minutes, the resin will be thermally deteriorated due to the long residence time, which is not preferable.

In any producing the polyamide resin composition (B) using a twin-screw extruder with an L/D0 of 50 or more, and producing the polyamide resin composition (B) by melt-kneading while stretch-flowing, with respect to the compounding ratio of the polyamide resin (B1) and the resin (B2) having a reactive functional group, if the polyamide resin (B1) is 80 to 60% by weight and the resin (B2) is 20 to 40% by weight, the polyamide resin (B1) forms a continuous phase and the resin (B2) forms a dispersed phase, and in the particles of the resin (B2), the compound (B3) of 1 to 100 nm produced by the reaction of the resins (B1) and (B2) is contained, and further, the area ratio occupied by the compound (B3) tends to be 20% or more, which is preferable.

Ammonium Salt (C)

The polyamide resin composition contains an ammonium salt (ammonium salt (C)) composed of an aliphatic dicarboxylic acid having 6 to 12 carbon atoms and ammonia. The ammonium salt (C) is a compound represented by the chemical formula $(R(COO^-)_2 \cdot (NH^{4+})_2)$ (where R is a divalent aliphatic group), and primary ammonium salts, secondary ammonium salts, tertiary ammonium salts, and quaternary ammonium salts, in which the hydrogen atoms of the ammonium ion are substituted with one or more functional groups other than hydrogen atoms, do not correspond to our ammonium salt (C).

When an aliphatic dicarboxylic acid having 6 to 12 carbon atoms is used instead of the ammonium salt (C), as there is when such an aliphatic dicarboxylic acid may be used as a raw material for the polyamide resin composition (B), since the affinity with the polyamide resin (B1) contained in the polyamide resin composition (B) is relatively high, and the amino group of the polyamide resin (B1) contained in the polyamide resin composition (B) and the carboxyl group of the aliphatic dicarboxylic acid are capable of reacting, it is presumed to be dispersed to some extent in the polyamide resin (B1) contained in the polyamide resin composition (B). However, since the aliphatic dicarboxylic acid is an acid, if its content increases, it decomposes the polyamide resin (B1) contained in the polyamide resin composition (B), resulting in deterioration of the mechanical properties of the obtained molded article.

On the other hand, since the ammonium salt of an aliphatic dicarboxylic acid having 5 or less carbon atoms has a relatively high affinity with the polyamide resin (B1) contained in the polyamide resin composition (B), it is presumed to be dispersed in the polyamide resin (B1) contained in the polyamide resin composition (B). However, the ammonium salt of an aliphatic dicarboxylic acid having 5 or less carbon atoms has a low molecular weight, and since the ammonium salt is decomposed during the production of the polyamide resin (B1) contained in the polyamide resin composition (B), mechanical properties of the obtained molded article will be decreased.

By using our ammonium salt (C) composed of an aliphatic dicarboxylic acid having 6 to 12 carbon atoms and ammonia, the following functions and effects can be obtained.

Namely, since the ammonium salt (C) is considered to coordinate with the amide group or carboxyl terminal group of the polyamide resin (B1) contained in the polyamide resin composition (B), the ammonium salt (C) has an excellent compatibility with the polyamide resin (B1) contained in the polyamide resin composition (B), it can be finely dispersed in the polyamide resin composition, and improves the flowability of the polyamide resin composition (B). Furthermore, since the ammonium salt (C) that modifies the flowability exhibits a good affinity with the polyamide resin (B1) contained in the polyamide resin composition (B), in a fiber-reinforced polyamide resin molded article because the fiber dispersibility of the reinforcing fibers (A) is not inhibited, the reinforcing fibers (A) can be dispersed as single fibers inside the molded article, and the fiber dispersibility of the molded article can be improved. In addition, since the ammonium salt (C) exhibits a high affinity with the polyamide resin (B1), it is also excellent in the point that bleeding out to the surface of the molded article can be suppressed.

Further, since the ammonium salt (C) has a higher molecular weight than an ammonium salt composed of an aliphatic dicarboxylic acid having 5 or less carbon atoms and ammonia, decomposition and volatilization of the ammonium salt (C) are suppressed. Further, since the ammonium salt (C) is neutral, even if it is contained in a large amount, decomposition of the polyamide resin by acid or base is suppressed during production of the polyamide composition. Therefore, it is possible to more effectively improve the flowability of the polyamide resin composition (B) and improve the mechanical properties and appearance quality of the obtained molded article.

As concrete examples of the ammonium salt (C), exemplified are diammonium adipate, diammonium pimelate, diammonium suberate, diammonium azelate, diammonium sebacate, ammonium dodecanedioate and the like. Two or more types may be used as needed. Among them, diammonium adipate and diammonium sebacate are preferably used from the viewpoint of raw material availability, performance balance and cost.

In the fiber-reinforced polyamide resin composition molded article, the content of ammonium salt (C) is 0.1 to 10 parts by weight. with respect to the total of 100 parts by weight of the reinforcing fibers (A), the polyamide resin composition (B) and the ammonium salt (C). If the content of the ammonium salt (C) is less than 0.1 part by weight, the flowability, fiber dispersibility and mechanical properties of the fiber-reinforced polyamide resin composition (B) are lowered. The content of the ammonium salt (C) is preferably 0.2 parts by weight or more, more preferably 0.3 parts by weight or more, with respect to the total of 100 parts by weight of the reinforcing fibers (A), the polyamide resin composition (B) and the ammonium salt (C). On the other hand, if the content of the ammonium salt (C) exceeds 10 parts by weight, the plasticization of the polyamide resin (B1) is accelerated, and the mechanical properties of the obtained molded article decrease. The content of the ammonium salt (C) is preferably 5 parts by weight or less, more preferably 3 parts by weight or less, further preferably 1.5 parts by weight or less, with respect to the total of 100 parts by weight of the reinforcing fibers (A), the polyamide resin composition (B) and the ammonium salt (C).

The content of the ammonium salt (C) and the content of the ammonium ion [B] in the resin composition are determined by the following methods.

When incompatible components such as inorganic particles and organic particles are contained in the polyamide resin composition, these components are separated as they are or after being converted into other forms such as oxides, and then the content thereof per unit weight of the polyamide resin composition is determined. The separation method can be appropriately selected according to the contained components, and it is not particularly restricted. On the other hand, when other compatible organic or inorganic components are contained, the components that can be separated by extraction with water, organic solvents or the like are separated by extraction, and the content thereof per unit weight of the polyamide resin composition is determined, and if such a manner is difficult, the content per unit weight of the polyamide resin composition is determined by determining the content in the composition according to the analysis method such as spectroscopic method according to the contained component. The content of the polyamide resin (B1) contained per unit weight of the polyamide resin composition containing a compatible organic component or inorganic component can be determined by this method.

On the other hand, since the ammonium salt (C) can be extracted with water, a known weight of the polyamide resin composition is extracted with, for example, a Soxhlet extractor for a sufficient period of time, and the extract is analyzed according to the components contained, for example, by using methods such as NMR, FT-IR, GC-MS, liquid chromatography alone or in combination, whereby the chemical structure of the ammonium salt (C) can be identified, the content of the ammonium salt (C) and the content of the ammonium ion can be determined.

Content of Each Component

The molded article contains 5 to 50 parts by weight of the reinforcing fibers (A) with respect to the total of 100 parts by weight of the reinforcing fibers (A), the polyamide resin composition (B) and the ammonium salt (C). If the content of the reinforcing fibers (A) is less than 5 parts by weight, the mechanical properties of the molded article, especially the bending property and the impact property, are decreased. The content of the reinforcing fibers (A) is preferably 7 parts by weight or more, more preferably 10 parts by weight or more. On the other hand, if the content of the reinforcing fibers (A) exceeds 50 parts by weight, the entanglement between fibers increases. As a result, fiber breakage occurs, shortening the fiber length and decreasing bending properties and impact properties. The content of the reinforcing fibers (A) is preferably 30 parts by weight or less, more preferably 20 parts by weight or less, and further preferably 15 parts by weight or less.

The content of the polyamide resin composition (B) in the molded article is 40 to 94.9 parts by weight with respect to the total of 100 parts by weight of the reinforcing fibers (A), the polyamide resin composition (B) and the ammonium salt (C). If the content of the polyamide resin composition (B) is less than 40 parts by weight, because entanglement between the reinforcing fibers (A) increases and fiber breakage occurs, the fiber length is shortened and the flexural strength and impact property are lowered. The content of the polyamide resin composition (B) is preferably 50 parts by weight or more. On the other hand, if the content of the polyamide resin composition (B) exceeds 94.9 parts by weight, because the contents of the carbon fibers (A) and the ammonium salt (C) become relatively low, the reinforcing effect of the fibers becomes low, and mechanical properties, especially bending property and impact property, are decreased. The content of the polyamide resin composition (B) is preferably 85 parts by weight or less, more preferably 80 parts by weight or less.

Other Components (D)

The molded article may contain another component (D) in addition to the above-described components (A) to (C) as long as the desired effect is not impaired. As the examples of the other component (D), exemplified are thermosetting resins, petroleum resins, flame retardants, crystal nucleating agents, ultraviolet absorbents, antioxidants, damping agents, antibacterial agents, insect repellents, deodorants, anti-coloring agents, heat stabilizers, release agents, antistatic agents, plasticizers, lubricants, foaming agents, foam control agents, coupling agents and the like.

As the other component (D), to ensure higher fiber dispersibility, an epoxy resin, a phenolic resin, or a terpene resin may be contained, and two or more of these may be contained. As the component (D), one having a high affinity with the polyamide resin composition (B) is preferred. By selecting the component (D) having a high affinity with the polyamide resin composition (B), because it is efficiently compatible with the polyamide resin composition (B) during injection molding, the dispersibility of the carbon fibers (A1) and the organic fibers (A2) can be further improved.

The component (D) is appropriately selected according to the combination with the molding temperature of the polyamide resin composition (B). For example, if the molding temperature is 150° C. to 270° C., a terpene resin is preferably used. If the molding temperature is 270° C. to 320° C., a phenolic resin is preferably used.

The component (D) preferably has a weight loss on heating of 10% by weight or less when the molding temperature is elevated by 10° C./min (in air). It is more preferably 5% by weight or less, and further preferably 3% by weight or less. When such a weight loss on heating is 10% by weight or less, generation of decomposition gas can be suppressed when it is injection molded together with the polyamide resin composition (B), and generation of voids can be suppressed after molding. Further, especially in molding at a high temperature, generation of gas can be suppressed.

The weight loss on heating means the weight loss rate of the component (D) before and after heating under the above-described heating conditions, when the weight of the component (D) before heating referred to as 100%, and it can be determined by the following equation. The weights before and after heating can be determined by measuring the weights at the molding temperature by thermogravimetric analysis (TGA) using a platinum sample pan under a condition in an air atmosphere at a temperature elevation rate of 10° C./min.

Loss on heating[% by weight]={(weight before heating−weight after heating)/weight before heating}×100

As the terpene resin, for example, polymers or copolymers obtained by polymerizing a terpene monomer with, if necessary, aromatic monomers or the like in the presence of a Friedel-Crafts-type catalyst in an organic solvent, can be exemplified. In particular, as the terpene monomer, α-pinene, β-pinene, dipentene, and d-limonene are preferred because of their excellent compatibility with the polyamide resin composition (B), and further, homopolymers of these terpene monomers are more preferred. Further, hydrogenated terpene resins obtained by hydrogenating these terpene resins, and terpene phenol resins obtained by reacting terpene monomers and phenols in the presence of a catalyst can also be used. As the phenols, those having 1 to 3 substituents of at least one selected from the group consisting of an alkyl group, a halogen atom and a hydroxyl group on the benzene ring of phenol are preferably used. Among these, phenol and cresol are preferred. Among these, the hydrogenated terpene resin is preferable because of its excellent compatibility with the polyamide resin composition (B).

Although the glass transition temperature of the terpene resin is not particularly limited, it is preferably 30 to 100° C. If the glass transition temperature is 30° C. or higher, the component (D) is excellent in handleability during molding. Further, if the glass transition temperature is 100° C. or lower, the flowability of the component (D) during molding can be moderately suppressed, and the moldability can be improved.

The content of the component (D) in the molding material is preferably 1 to 20 parts by weight with respect to the total of 100 parts by weight of the reinforcing fibers (A), the polyamide resin composition (B) and the ammonium salt. When the content of the component (D) is less than 1 part by weight, the dispersibility of the carbon fibers (A1) and the organic fibers (A2) during injection molding is reduced. The content of the component (D) is preferably 2 parts by weight or more, more preferably 4 parts by weight or more. On the other hand, when the content of the component (D) exceeds 20 parts by weight, the bending property and the impact property of the molded article are decreased. It is preferably 15 parts by weight or less, more preferably 12 parts by weight or less, and further preferably 10 parts by weight or less.

The molding material is not particularly limited, but columnar bodies having cross sections as shown in FIGS. 1 to 4 can be exemplified as concrete shapes. In such columnar bodies, it is preferred that the carbon fibers (A1) and the organic fibers (A2) are aligned almost in parallel to the axial direction of the columnar body, and preferably the length of the carbon fibers (A1) and the organic fibers (A2) and the length of the molding material are substantially the same. By the condition where the fiber length is substantially the same as the length of the molding material, it is easy to control the fiber length of the carbon fibers (A1) and the organic fibers (A2) in the molded article produced using it, and further, since it can be set to be relatively long, a molded article having better mechanical properties can be obtained. The "aligned almost in parallel" means a state where the longitudinal axis of the fiber bundle containing the carbon fibers (A1) and the organic fibers (A2) and the longitudinal axis of the molding material are directed in the same direction, and the angular deviation between the axes is preferably 20° or less, more preferably 10° or less, and further preferably 5° or less. The length of the molding material means a length in the aligned direction of the fiber bundle in the molding material, and in the columnar body as described above, it is the length in the longitudinal-axis direction of the columnar body. Further, "substantially the same length" means a state where the fiber bundle is not intentionally cut inside the molding material, and the fiber bundle that is significantly shorter than the entire length of the molding material is not substantially contained. In particular, the amount of fiber bundles shorter than the entire length of the molding material is not limited, but the content of fiber bundles having a length of 50% or less of the entire length of the molding material is preferably 30% by mass or less in the total fiber bundles, more preferably 20% by mass or less. More preferably, the content of fiber bundles having a length of 85% or more of the entire length of the molding material is preferably 80% by mass or more, more preferably 90% by mass or more.

It is preferred that the molding material has substantially the same cross-sectional shape continuously for a certain length in the longitudinal direction. The longitudinal length of the molding material is 3 mm to 7 mm. If the length is less than 3 mm, the reinforcing effect of the fibers is poor. In other words, in molding using a molding material of less than 3 mm, because the weight average fiber length of the organic fibers in the resulting molded article cannot be sufficiently increased, the impact resistance becomes poor. The length of the molding material is preferably 4 mm or more, more preferably 5 mm or more. On the other hand, if the length of the molding material exceeds 7 mm, the moldability during injection molding is lowered. In other words, if the length of the molding material exceeds 7 mm, the molding material is too long to be caught in the injection molding machine, which is not preferred.

The molding material preferably has a fiber bundle containing the carbon fibers (A1) and the organic fibers (A2), which are continuous fiber bundles, in the resin composition comprising the polyamide resin composition (B) and the ammonium salt (C). In other words, it is preferred to have a configuration in which the polyamide resin composition (B) and the ammonium salt (C) are arranged outside the fiber bundle. The polyamide resin composition (B) may contain the component (D), and further, it may be configured that a composite fiber bundle (E) filled with the component (D) is constituted between the respective single fibers of the fiber bundle, and the polyamide resin composition (B) and the ammonium salt (C) are arranged outside thereof. The composite fiber bundle (E) is formed by impregnating the component (D) in the fiber bundle, and it is in a state where the carbon fibers (A1) and the organic fibers (A2) are dispersed like islands in the sea of the component (D).

The molding material preferably has a core-sheath structure in which the fiber bundle or the composite fiber bundle (E) is coated with the polyamide resin composition (B) and the ammonium salt (C). The polyamide resin composition (B) and the ammonium salt (C), which have a sheath structure, may optionally contain other components to form a polyamide resin composition. The "coated structure" indicates a structure in which a composition containing the polyamide resin composition (B) and the ammonium salt (C) (hereinafter, even when it is a composition, it may be simply referred to as "polyamide resin composition (B)") refers is placed on and adhered to the surface of the fiber bundle or the composite fiber bundle (E).

The component (D) contained in the molding material often has a low molecular weight and is usually a relatively brittle and easily crushable solid or liquid at room temperature. By the structure containing the polyamide resin composition (B) on the outside of the composite fiber bundle (E), the polyamide resin composition (B) with a high molecular weight protects the composite fiber bundle (E) and suppresses the crushing and scattering of the component (D) due to the impact, abrasion and the like at the time of transportation and handling of the molding material, and it is possible to maintain the shape of the molding material. From the viewpoint of handling, the molding material preferably retains the aforementioned shape until it is subjected to molding.

The composite fiber bundle (E), the polyamide resin composition (B) and the ammonium salt (C) may be in a state where the polyamide resin composition (B) and the ammonium salt (C) partially enter into a part of the composite fiber bundle (E) near the boundary to make a state compatible with each other, or may be in a state where the polyamide resin composition (B) and the ammonium salt (C) impregnate into the composite fiber bundle (E).

The carbon fibers (A1) and the organic fibers (A2) are preferably unevenly distributed in the cross section of the fiber bundle. The cross section of the fiber bundle indicates a cross section perpendicular to the fiber length direction of the fiber bundle. In the cross section of the fiber bundle, by the uneven distribution of the carbon fibers (A1) and the organic fibers (A2), entanglement of the carbon fibers (A1) and the organic fibers (A2) during molding can be suppressed and a molded article in which the carbon fibers (A1) and the organic fibers (A2) are uniformly dispersed can be obtained. Therefore, the impact property of the molded article can be more improved. The term "unevenly distributed" means, in the cross section of the fiber bundle, not a state where the carbon fibers (A1) and the organic fibers (A2) exist evenly over the entire region, but a state where they are partially unevenly distributed.

Figure 2:
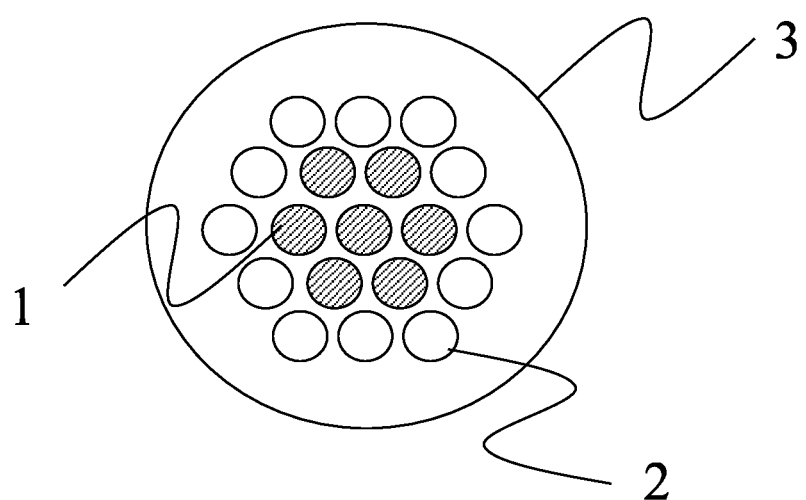
FIG. 2 is a schematic diagram showing a configuration in which organic fibers (A2) enclose carbon fibers (A1) in a cross section of a molding material of a fiber-reinforced polyamide resin composition molded article.
Figure 3:
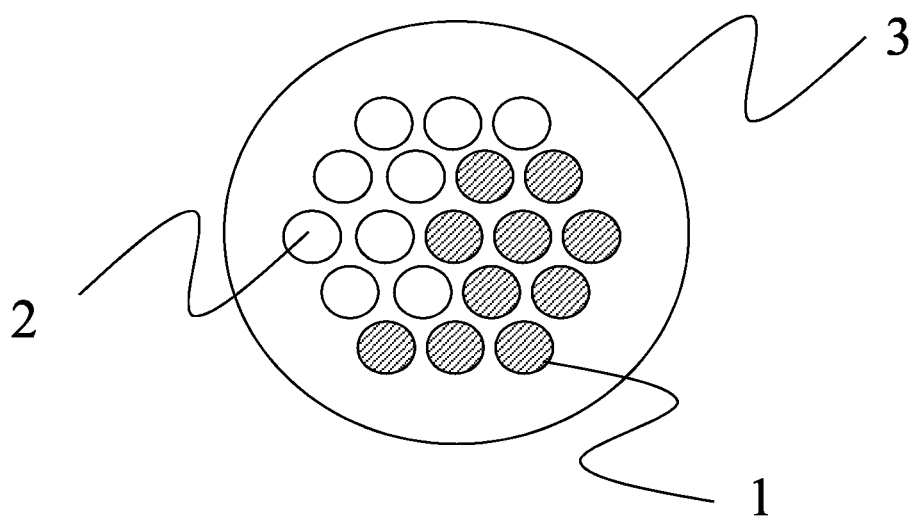
FIG. 3 is a schematic diagram showing a configuration in which a bundle of carbon fibers (A1) and a bundle of organic fibers (A2) exist in a state separated from each other by a boundary portion in a cross section of a molding material of a fiber-reinforced polyamide resin composition molded article.
Figure 4:
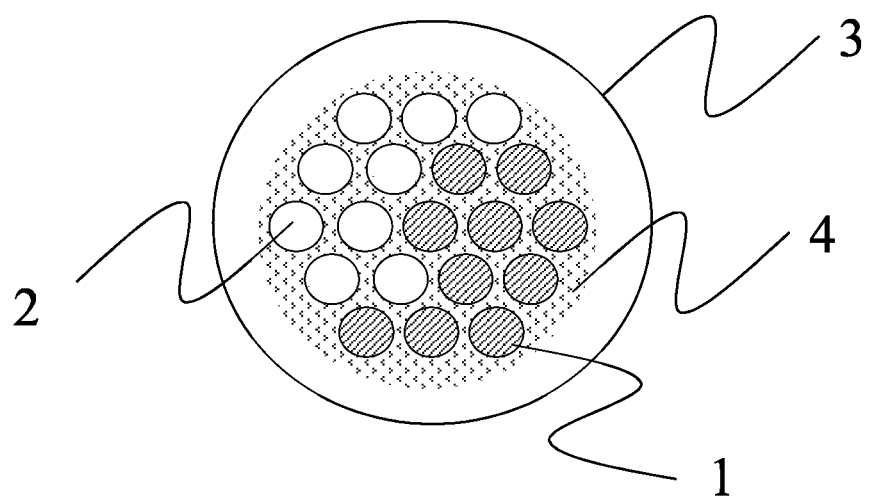
FIG. 4 is a schematic diagram showing a configuration in which a component (D) is adhered to a fiber bundle comprising carbon fibers (A1) and organic fibers (A2) in a cross section of a molding material of a fiber-reinforced polyamide resin composition molded article.

For example, a configuration in which in the cross section of the fiber bundle in the polyamide resin composition (B) and the ammonium salt (C) 3, carbon fibers (A1) 1 encapsulate organic fibers (A2) 2 as shown in FIG. 1, a so-called core-sheath structure such a configuration as shown in FIG. 2 in which the organic fibers (A2) 2 encapsulate the carbon fibers (A1) 1, a structure as shown in FIG. 3 in which a bundle of (A1) 1 and a bundle of the carbon fibers (A1) 1 and a bundle of the organic fibers (A2) 2 exist respectively in a state separated by a certain boundary, and the like, are exemplified as the configuration of "unevenly distributed." The term "encapsulation" indicates an example in which the carbon fibers (A1) are arranged as the core and the organic fibers (A2) are arranged as the sheath, an example in which the organic fibers (A2) are arranged as the core and the carbon fibers (A1) are arranged as the sheath or the like. In the example shown in FIG. 3, at least a part of each of the carbon fibers (A1) and the organic fibers (A2) is in contact with the outer layer of the polyamide resin composition (B) and the ammonium salt (C) 3 in the cross section of the fiber bundle. At this time, in the example where the carbon fibers (A1) or the organic fibers (A2) is in contact with the polyamide resin composition (B) and the ammonium salt (C) 3, as shown in FIG. 4, also included is a configuration in which the carbon fibers (A1) or the organic fibers (A2) are in contact with the polyamide resin composition (B) and the ammonium salt (C) 3 via the component (D).

As a method of confirming that the carbon fibers (A1) and the organic fibers (A2) are unevenly distributed in the fiber bundle, for example, exemplified is a method of observing a cross section perpendicular to the fiber length direction of the molding material with an optical microscope at a magnification of 300 times, and performing image processing of the obtained microscopic image for analyzing it.

As the method of unevenly distributing the carbon fibers (A1) and the organic fibers (A2) in the cross section of a fiber bundle, a method of aligning a bundle of carbon fibers (A1) and a bundle of organic fibers (A2) to produce the molding material can be exemplified. By preparing the molding material by aligning the respective bundles, the carbon fibers (A1) and the organic fibers (A2) exist as independent fiber bundles and they can be unevenly distributed. By increasing the numbers of single fibers in the bundle of the carbon fibers (A1) and the bundle of the organic fibers (A2) bundle used, the bundles can be made larger, and by decreasing the numbers of single fibers, the bundles can be made smaller, and therefore, the uneven distribution becomes possible by changing the sizes of the bundles.

Although the carbon fibers (A1) are not particularly restricted, it is preferred to use a fiber bundle having a number of carbon fibers of 100 to 350,000, and more preferred to use a fiber bundle having a number of carbon fibers of 20,000 to 100,000 from the viewpoint of productivity. On the other hand, when polyester fibers or liquid crystal polyester fibers are used as the organic fibers (A2), there is no particular restriction, but it is preferred to use a fiber bundle having a number of fibers of 1 to 2,000, more preferred to use a fiber bundle having a number of fibers of 10 to 1,000, and further preferred to use a fiber bundle having a number of fibers of 30 to 700.

By molding using the above-described molding material, a molded article excellent in dispersibility of the carbon fibers (A1) and the organic fibers (A2) and moldability and excellent in flexural strength and impact property can be obtained.

Next, a method of producing the above-described molding material will be explained. The molding material can be obtained, for example, by the following method.

First, a roving of carbon fibers (A1) and a roving of organic fibers (A2) are doubled in parallel in the longitudinal direction of fiber length to prepare a fiber bundle having carbon fibers (A1) and the organic fibers (A2). The melted component (D) is then impregnated into the fiber bundle to prepare a composite fiber bundle (E). Further, the composite fiber bundle (E) is led to an impregnation die filled with a composition containing molten polyamide resin composition (B) and ammonium salt (C), and the polyamide resin composition (B) and the ammonium salt (C) are coated onto the outside of the composite fiber bundle (E), and it is pulled out through a nozzle. There is a method of obtaining a molding material by pelletizing it into a predetermined length after cooling and solidifying. The polyamide resin composition (B) and the ammonium salt (C) may be impregnated in the fiber bundle, as long as they are arranged at least outside the composite fiber bundle (E).

A molding material prepared by the above-described method, in which the composite fiber bundle (E) is coated with the polyamide resin composition (B) and the ammonium salt (C), and pellets containing the polyamide resin composition (B) (carbon fibers (A1) or the organic fibers (A2) are not contained) may be pellet blended to obtain a molding material mixture. By this, the contents of the carbon fibers (A1) and the organic fibers (A2) in the molded article can be easily adjusted. The pellet blending indicates, differently from melt-kneading, a method of stirring and mixing a plurality of materials at a temperature at which the resin components do not melt to create a substantially uniform state, and it is preferably used for using a pellet-shaped molding material mainly such as injection molding or extrusion molding.

Next, a method of producing the molded article will be explained.

A molded article excellent in moldability, bending property, impact property and appearance quality can be obtained by molding using the aforementioned molding material. As the molding method, a molding method using a mold is preferable, and various molding methods such as injection molding, extrusion molding and press molding can be used. In particular, a molding method using an injection molding machine makes it possible to continuously obtain stable molded articles. Although the conditions for injection molding are not particularly limited, for example, the injection time is preferably 0.5 to 10 seconds, more preferably 2 to 10 seconds. The back pressure is preferably 0.1 MPa or higher, more preferably 1 MPa or higher, further preferably 2 MPa or higher, and most preferably 3 MPa or higher. The upper limit is preferably 50 MPa or less, more preferably 30 MPa or less, further preferably 20 MPa or less, and most preferably 10 MPa or less. The injection speed is preferably 1 mm/s to 200 mm/s, more preferably 10 mm/s to 150 mm/s, and further preferably 20 mm/s to 100 mm/s. The screw rotational speed is preferably 10 rpm to 200 rpm, more preferably 30 rpm to 150 rpm, and further preferably 50 rpm to 100 rpm. The holding pressure is preferably 1 MPa to 50 MPa, more preferably 1 MPa to 30 MPa. The holding pressure time is preferably 1 to 20 seconds, more preferably 5 to 20 seconds. The cylinder temperature is preferably 200° C. to 320° C. and the mold temperature is preferably 20° C. to 100° C. The cylinder temperature indicates a temperature of the part of the injection molding machine that heats and melts the molding material, and the mold temperature indicates a temperature of the mold into which the resin is injected to form a predetermined shape. By appropriately selecting these conditions, especially the injection time, the back pressure and the mold temperature, the fiber length of carbon fibers and organic fibers in the molded article can be easily adjusted.

The molded article obtained as described above is excellent in moldability and excellent in mechanical properties, particularly flexural strength, impact resistance, and appearance quality.

EXAMPLES

Our molded articles will be explained in more detail with reference to examples below, but this disclosure is not limited to the description of the examples. First, methods of evaluating various properties used in the examples will be explained.

(1) Measurement of Weight Average Fiber Length

A 0.5 cm square test piece cut out from an ISO type dumbbell test piece obtained in each Example and Comparative Example was heated on a hot stage set at a temperature at which the organic fibers (A2) did not melt and only the polyamide resin composition (B) melted (for example, 200 to 300° C.), at a state of being sandwiched between cover glasses, to form a film and uniformly disperse the fibers without applying an excessive pressure. The film in which the carbon fibers (A1) and the organic fibers (A2) were uniformly dispersed was observed with an optical microscope (50 to 200 times). With respect to 1,000 randomly selected carbon fibers (A1) and 1,000 randomly selected organic fibers (A2), the respective fiber lengths were measured, and the weight average fiber length was calculated from the following equation:

$$\text{Average fiber length} = \Sigma(Mi^2 \times Ni)/\Sigma(Mi \times Ni)$$

Mi: fiber length (mm)
Ni: number of fibers of fiber length Mi.

(2) Measurement of Flexural Strength and Flexural Modulus of Molded Article, Flexural Modulus Upon Water Absorption For an ISO type dumbbell test piece obtained in each Example and Comparative Example, the flexural strength and flexural modulus were measured according to ISO 1782010, Amd. 12013, using a 3-point bending test jig (indenter radius 5 mm) with a fulcrum distance set to 64 mm, at a test condition of a test speed of 2 mm/min. As the testing machine, an "Instron (registered trademark)" universal testing machine model 5566 (supplied by Instron Corporation) was used. The measurement was performed three times, and the average value thereof was calculated as the flexural strength and flexural modulus of each Example and Comparative Example. At that time, the flexural modulus was calculated from the stress gradient in the specified strain section (0.05 to 0.25%). Further, the flexural modulus was also measured in the same manner as described above for a water-absorbing ISO type dumbbell test piece to be described later.

(3) Measurement of Charpy Impact Strength of Molded Article

A parallel part of an ISO type dumbbell test piece obtained in each Example and Comparative Example was cut out, and using a C1-4-01 type testing machine supplied by Tokyo Shikenki Co., Ltd., a Charpy impact test with a V notch in accordance with ISO179 was performed. The measurement was performed 5 times, and the average value thereof was calculated as the impact strength (kJ/m$^2$) of each Example and Comparative Example.

(4) Evaluation of Fiber Dispersibility of Molded Article

The number of undispersed carbon fiber bundles (CF bundles) present on each of the front and back surfaces of each test piece of 80 mm×80 mm×3 mm thickness obtained in each Example and Comparative Example was visually counted. Evaluation was performed on 50 molded articles, the fiber dispersibility with respect to the total number was determined according to the following criteria and rank A and rank B were determined to be acceptable:
- A: Number of undispersed CF bundles is less than 1.
- B: Number of undispersed CF bundles is 1 or more and less than 3.
- C: Number of undispersed CF bundles is 3 or more.

(5) Evaluation of Flowability

The fiber-reinforced polyamide resin composition pellets were vacuum-dried at 80° C. for 12 hours, and using an injection molding machine (J110AD) supplied by Japan Steel Works, Ltd., they were injection molded at conditions of the cylinder temperature melting point of polyamide resin+15° C., mold temperature 80° C., injection speed 60 mm/sec and injection pressure 60 MPa using a mold of width 10 mm×length 150 mm×depth 1.0 mm to prepare a bar flow test piece of width 10 mm×thickness 1.0 mm. The bar flow length at 0 holding pressure was measured 5 times, and the average value thereof was determined to evaluate the flowability. It shows that the longer the flow length, the better the flowability.

(6) Observation of Morphology

A JIS-5A dumbbell-type test piece or bending test piece obtained by injection molding was cut into 1 to 2 mm square at the central portion of the test piece in the cross-sectional direction, and by dying with ruthenium tetroxide, a resin (B2) having a reactive functional group was dyed. The test piece was cut at −196° C. with an ultramicrotome to prepare an ultra-thin cut piece with a thickness of 0.1 μm or less (approximately 80 nm). The cut piece was observed with a transmission electron microscope. The number average particle diameter (Xn) was determined by randomly extracting 400 or more particles from the obtained image, analyzing the particle diameter distribution using an image analysis software "Scion Image" supplied by Scion Corporation, and it was determined by the following equation:

$$\text{Number average particle diameter } (Xn) = \Sigma(Xi \times ni)/\Sigma ni$$

Xi: particle diameter ni: number of particles corresponding to the particle diameter (Xi) (i=1, 2, 3, . . . , n).

The number average particle diameter of the particles comprising the resin (B2) is calculated from an image magnified 10,000 times, and the number average particle diameter of the fine particles in the particles comprising the resin (B2) is calculated from an image magnified 35,000 times. The number average particle diameter of the particles comprising the resin (B2), and the presence or absence of fine particles of 1 to 100 nm and the presence or absence of fine particles exceeding 300 nm of the compound (B3) were confirmed.

Furthermore, the area ratio occupied by the compound (B3) was determined by using a transmission electron microscope and analyzing the area of the resin (B2) and the area occupied by the compound (B3), respectively, and determining by the following equation:

$$Sn = Sp/(Sa2 + Sp)$$

Sn: ratio of area occupied by compound (B3) in particle comprising resin (B2)
Sa2: area occupied by resin (B2)
Sp: area occupied by compound (B3).

(7) Measurement of Water Absorption Rate

After the weight of an ISO type dumbbell test piece obtained in each Example and Comparative Example was weighed after being left in a constant temperature chamber at 23° C. and 50% humidity for 24 hours, it was placed in an environment of 80° C.×95% RH for 24 hours. Thereafter, the weight of the obtained water-absorbing ISO type dumbbell test piece after wiping off water was weighed, and the water absorption rate of the ISO type dumbbell test piece before and after water absorption was calculated.

Carbon Fibers (A1)

Reference Example 1: Preparation of Carbon Fibers (A1)

A copolymer containing polyacrylonitrile as a main component was spun, calcined, and surface-oxidized to prepare continuous carbon fibers having a total number single fibers of 24,000, a diameter of a single fiber of 7 μm, a mass per unit length of 1.6 g/m, a specific gravity of 1.8 g/cm$^3$ and a surface oxygen ratio [O/C] of 0.2. The continuous carbon fibers had a strand tensile strength of 4,880 MPa and a strand tensile modulus of 225 GPa. Subsequently, a sizing agent mother liquid was prepared by dissolving glycerol polyglycidyl ether as a polyfunctional compound in water to be 2% by weight, and the sizing agent was provided to the carbon fibers by dipping method and dried at 230° C. The carbon fibers thus prepared had a sizing agent adhesion amount of 1.0% by weight.

Reference Example 2: Preparation of Dendritic Polyester (C-3)

51.93 g (0.38 mol) of p-hydroxybenzoic acid, 19.1 g (0.10 mol) of 4,4'-dihydroxybiphenyl and 5.86 g (0.035 mol) of terephthalic acid, 21.2 g (0.10 mol) of trimesic acid, 5.55 g (0.045 mol) of benzoic acid, 11.3 g (0.059 mol) of polyethylene terephthalate with an intrinsic viscosity of about 0.6 dl/g and 65.3 g of acetic anhydride (1.10 equivalents of the total phenolic hydroxyl groups) were charged into a reactor of 500 mL equipped with a stirring blade and a distillation tube, and they were reacted at 150° C. for 1.5 hours under a nitrogen gas atmosphere while being stirred. After elevating the temperature to 290° C. over 3 hours, the pressure was reduced to 1.0 mmHg (133 Pa) over 30 minutes while maintaining the polymerization temperature at 290° C., and the polymerization reaction was stopped when the stirring torque reached 2.5 kg cm, and the contents were discharged into water. The resulting dendritic polyester (C-1) pulverized using a blender after being dried and heated at 110° C. for 4 hours, and washed with ethanol and deionized water.

Thereafter, it was vacuum-dried at 110° C. for 24 hours using a vacuum heating dryer to prepare powdery dendritic polyester (C-3).

Organic Fibers (A2)
- (A2-1): A liquid crystal polyester fiber ("Siveras" (registered trademark) 1700T-288f supplied by Toray Industries, Inc., strength 23.5 cN/dtex, melting point 330° C.) was used.
- (A2-2): A polyester fiber ("Tetoron" (registered trademark) 2200T-480-705M supplied by Toray Industries, Inc., single fiber fineness 4.6 dtex, melting point 260° C.) was used.
- (A2-3): A polyphenylene sulfide fiber ("Torcon" (registered trademark) 400T-100-190 supplied by Toray Industries, Inc., single fiber fineness 4.0 dtex, melting point 285° C.) was used.
- (A2-4): A polytetrafluoroethylene fiber ("Toyoflon" (registered trademark) 440T-60F-S290-M190 supplied by Toray Industries, Inc., single fiber fineness 7.3 dtex, melting point 327° C.) was used.

Polyamide Resin Composition (B)
Polyamide Resin (B1a)
- (B1a-1): Nylon 6 resin with a melting point of 225° C. and a relative viscosity at 0.01 g/ml in 98% sulfuric acid of 2.75
- (B1a-2): Nylon 66 resin with a melting point of 265° C. and a relative viscosity at 0.01 g/ml in 98% sulfuric acid of 3.60
- (B1a-3): Nylon 610 resin with a melting point of 225° C. and a relative viscosity at 0.01 g/ml in 98% sulfuric acid of 2.70

Polyamide Resin (B1b)
- (B1b-1): Nylon 610 resin with a melting point of 225° C. and a relative viscosity at 0.01 g/ml in 98% sulfuric acid of 2.70
- (B1b-2): Nylon 11 resin with a melting point of 190° C. and a relative viscosity at 0.01 g/ml in 98% sulfuric acid of 2.55
- (B1b-3): Nylon 12 resin with a melting point of 180° C. and a relative viscosity at 0.01 g/ml in 98% sulfuric acid of 2.55

Resin (B2) Having a Reactive Functional Group
- (B2-1): Glycidyl methacrylate-modified polyethylene copolymer "Bondfast" (registered trademark) BF-7L (supplied by Sumitomo Chemical Co., Ltd.)
- (B2-2): Glycidyl methacrylate-modified polyethylene copolymer "Bondfast" (registered trademark) BF-7M (supplied by Sumitomo Chemical Co., Ltd.)
- (B2-3): Maleic anhydride-modified ethylene-1-butene copolymer "Tafmer" (registered trademark) MH7020 (supplied by Mitsui Chemicals, Inc.)
- (B2-4): Ethylene-methacrylic acid-zinc methacrylate copolymer "Himilan" (registered trademark) 1706 (supplied by DuPont Mitsui Polychemicals Co., Ltd.)
- (B2-5): Oxazoline group-containing reactive polystyrene "Epocros" (registered trademark) RPS-1005 (supplied by Nippon Shokubai Co., Ltd.)

Ammonium Salt (C), or Flow Modifier (C) Used in Comparative Examples (C-2 and C-3)
- (C-1): diammonium adipate (supplied by FUJIFILM Wako Pure Chemical Industries, Ltd.)
- (C-2): Adipic acid (supplied by FUJIFILM Wako Pure Chemical Industries, Ltd.)
- (C-3): Dendritic polyester obtained in Reference Example 2 Component (D)
- (D-1): A solid terpene phenol resin ("Mighty Ace" (registered trademark) K125 supplied by Yasuhara Chemical Co., Ltd., softening point 125° C.) was used.

Example 1

Using a long fiber-reinforced resin pellet producing apparatus with a coating die for wire coating method installed at the tip of a TEX-30a type twin-screw extruder (screw diameter 30 mm, L/D=32) supplied by Japan Steel Works, Ltd., the temperature of the cylinder of the extruder was set at 270° C., and the polyamide resin composition (B1-1), the resin (B2-1) and the ammonium salt (C-1) shown above were supplied from the main hopper, and melt-kneaded at a screw rotational speed of 200 rpm. The composition containing the molten polyamide resin (B1-1), resin (B2-1) and ammonium salt (C-1) was supplied to the fiber bundle comprising the carbon fibers (A1) and the organic fibers (A2) at a die port (diameter: 3 mm) discharging the composition so that the carbon fibers (A1) and the organic fibers (A2) were continuously coated therearound with the composition containing the molten polyamide resin (B1-1), resin (B2-1) and ammonium salt (C-1). At that time, the carbon fibers (A1) and the organic fibers (A2) were unevenly distributed in the internal cross section of the composite fiber bundle (E). As shown in FIG. 3, the unevenly distributed state was such that at least a part of each of the carbon fibers (A1) and the organic fibers (A2) was in contact with the composition containing the molten polyamide resin (B1-1), resin (B2-1) and ammonium salt (C-1). After cooling the resulted strand, it was cut into pellets with a length of 7 mm by a cutter to obtain long fiber pellets. At that time, the take-up speed was adjusted so that the weight of reinforcing fibers (A) became 25 parts by weight (80 parts by weight of the carbon fibers (A1) and 20 parts by weight of the organic fibers (A2)) with respect to the total of 100 parts by weight of (A) to (C). The length of the carbon fibers (A1) and the organic fibers (A2) in the obtained long fiber pellets was substantially the same as the length of the pellets.

Using an injection molding machine (J110AD, supplied by Japan Steel Works, Ltd.), the long fiber pellets thus obtained were injection molded at conditions of an injection time 2 seconds, a back pressure: 5 MPa, a holding pressure: 40 MPa, a holding pressure time: 10 seconds, an injection speed: 30 mm/s, a screw rotational speed: 80 rpm, a cylinder temperature: 270° C. and a mold temperature: 80° C. t prepare an ISO dumbbell test piece (type A1) and a test piece with a size of 80 mm×80 mm×3 mm as molded articles. The cylinder temperature indicates a temperature of the part of the injection molding machine that heats and melts the molding material, and the mold temperature indicates a temperature of the mold into which the resin is injected to form a predetermined shape. The prepared test pieces (molded articles) were subjected to the evaluation of properties after being placed in a constant temperature and humidity chamber adjusted at a temperature of 23° C. and 50% RH for 24 hours. The evaluation results evaluated by the aforementioned methods are summarized in Table 1.

Examples 2-5, 7-17, 31-35, 41-54, 56

Molded articles were prepared and evaluated in the same manner as in Example 1 other than conditions where the composition ratio or the fiber type used was changed as shown in Tables 1 and 2 (in Example 13, the cylinder temperature was set at 280° C.). The evaluation results are summarized in Tables 1, 2, 3, 4 and 5.

Example 6

A molded article was prepared and evaluated in the same manner as in Example 1 other than a condition where the molding back pressure during injection molding was changed to 10 MPa. The evaluation results are summarized in Table 1.

Examples 18-30, 38-40, 55, 57

Using a long fiber-reinforced resin pellet producing apparatus with a coating die for wire coating method installed at the tip of a TEX-30a type twin-screw extruder (screw diameter: 30 mm, L/D=32) supplied by Japan Steel Works, Ltd., the temperature of the cylinder of the extruder was set at 270° C., and the polyamide resin composition (B1-1), the resin (B2-1) and the ammonium salt (C-1) shown above were supplied from the main hopper, and melt-kneaded at a screw rotational speed of 200 rpm. The amount of the component (D-1) melted by heating at 200° C. was adjusted to 8 parts by weight with respect to the total of 100 parts by weight of (A) to (C), and after the component was imparted to the fiber bundle comprising the carbon fibers (A1) and the organic fibers (A2) to form a composite fiber bundle (E), the composite fiber bundle (E) was supplied to a die port (diameter: 3 mm) for discharging the composition containing the molten polyamide resin (B1-1) and resin (B2-1) and the ammonium salt (C-1) so that the carbon fibers (A1) and the organic fibers (A2) were continuously coated therearound with the composition containing the molten polyamide resin (B1-1) and resin (B2-1) and the ammonium salt (C-1). At that time, the carbon fibers (A1) and the organic fibers (A2) were unevenly distributed in the internal cross section of the composite fiber bundle (E). As shown in FIG. 3, the unevenly distributed state was such that at least a part of each of the carbon fibers (A1) and the organic fibers (A2) was in contact with the composition containing the molten polyamide resin (B1-1), resin (B2-1) and ammonium salt (C-1). After cooling the resulted strand, a molded article was prepared and evaluated in the same manner as in Example 1 except that it was cut into a pellet length of 7 mm with a cutter to obtain long fiber pellets. The evaluation results are summarized in Tables 2, 3, 4 and 5.

Example 36

A molded article was prepared and evaluated in the same manner as in Example 1 other than a condition where the molding back pressure during injection molding was changed to 7 MPa. The evaluation results are summarized in Table 3.

Example 37

A molded article was prepared and evaluated in the same manner as in Example 1 other than a condition where the molding back pressure during injection molding was changed to 3 MPa. The evaluation results are summarized in Table 4.

Comparative Examples 1-7, 9-11

A molded article was prepared and evaluated in the same manner as in Example 1, other than a condition where the composition was changed as shown in Table 6. The evaluation results are summarized in Table 6.

Comparative Example 8

A molded article was prepared and evaluated in the same manner as in Example 1 other than a condition where the molding back pressure during injection molding was changed to 40 MPa. The evaluation results are summarized in Table 6.

TABLE 1

| | | | | Example 1 | Example 2 | Example 3 | Example 4 | Example 5 | Example 6 |
|---|---|---|---|---|---|---|---|---|---|
| Raw material | Reinforcing fibers (A) | Compounding amount | part by weight | 20.0 | 20.0 | 20.0 | 20.0 | 25.0 | 25.0 |
| | | Kind of fiber | — | A1 | A1 | A1 | A1 | A1/A2-1 | A1/A2-1 |
| | | Compounding amount of (A1) to total 100 parts by weight of (A1) and (A2) | part by weight | 100.0 | 100.0 | 100.0 | 100.0 | 80.0 | 80.0 |
| | | Compounding amount of (A2) to total 100 parts by weight of (A1) and (A2) | part by weight | — | — | — | — | 20.0 | 20.0 |
| | Polyamide resin composition (B) | Kind of (B1a) | — | B1a-1 | B1a-1 | B1a-1 | B1a-1 | B1a-1 | B1a-1 |
| | | Kind of (B1b) | — | | | | | | |
| | | Kind of (B2) | — | B2-1 | B2-1 | B2-1 | B2-1 | B2-1 | B2-1 |
| | | Compounding amount | part by weight | 79.7 | 79.0 | 75.0 | 79.9 | 74.7 | 74.7 |
| | Ammonium salt (C) | Kind | — | C-1 | C-1 | C-1 | C-1 | C-1 | C-1 |
| | | Compounding amount | part by weight | 0.3 | 1.0 | 5.0 | 0.1 | 0.3 | 0.3 |

TABLE 1-continued

| | | | | | | | | | |
|---|---|---|---|---|---|---|---|---|---|
| | Component (D) | Kind | — | — | — | — | — | — | — |
| | | Compounding amount | part by weight | — | — | — | — | — | — |
| Molded article | Average fiber length | $Lw_{a1}$ | mm | 0.8 | 0.9 | 1.2 | 0.5 | 0.7 | 0.5 |
| | | $Lw_{a2}$ | mm | — | — | — | — | 4.5 | 3.5 |
| | Water absorption rate | Weight of molded article left at 80° C. × 95% RH for 24 hours/weight before water absorption | % | 3.8 | 3.8 | 3.8 | 3.8 | 3.8 | 3.8 |
| | Morphology | Particle diameter of (B2) is 10 to 1,000 nm. | — | ○ | ○ | ○ | ○ | ○ | ○ |
| | | Particle diameter of (B3) is 10 to 100 nm. | — | ○ | ○ | ○ | ○ | ○ | ○ |
| | | Area ratio of (B3) in (B2) is 20% or more. | — | ○ | ○ | ○ | ○ | ○ | ○ |
| Result of evaluation | Charpy impact strength | | kJ/m² | 25.0 | 22.0 | 20.0 | 23.0 | 30.0 | 27.0 |
| | Flexural strength | | MPa | 200.0 | 210.0 | 230.0 | 180.0 | 200.0 | 180.0 |
| | Flexural modulus | | GPa | 12.0 | 12.0 | 12.0 | 12.0 | 12.0 | 12.0 |
| | Modulus upon water absorption | | GPa | 8.4 | 8.4 | 8.4 | 3.4 | 8.4 | 8.4 |
| | Flowability | | mm | 50.0 | 70.0 | 120.0 | 40.0 | 50.0 | 50.0 |
| | Dispersibility | | — | A | A | A | B | A | A |

| | | | | Example 7 | Example 8 | Example 9 | Example 10 | Example 11 | Example 12 |
|---|---|---|---|---|---|---|---|---|---|
| Raw material | Reinforcing fibers (A) | Compounding amount | part by weight | 25.0 | 40.0 | 15.0 | 30.0 | 25.0 | 25.0 |
| | | Kind of fiber | — | A1/A2-1 | A1/A2-1 | A1/A2-1 | A1/A2-1 | A1/A2-1 | A1/A2-1 |
| | | Compounding amount of (A1) to total 100 parts by weight of (A1) and (A2) | part by weight | 80.0 | 75.0 | 70.0 | 65.0 | 80.0 | 80.0 |
| | | Compounding amount of (A2) to total 100 parts by weight of (A1) and (A2) | part by weight | 20.0 | 25.0 | 30.0 | 35.0 | 20.0 | 20.0 |
| | Polyamide resin composition (B) | Kind of (B1a) | — | B1a-1 | B1a-1 | B1a-1 | B1a-1 | B1a-1 | B1a-1 |
| | | Kind of (B1b) | — | — | — | — | — | — | — |
| | | Kind of (B2) | — | B2-1 | B2-1 | B2-1 | B2-1 | B2-2 | B2-3 |
| | | Compounding amount | part by weight | 74.9 | 59.7 | 84.9 | 69.7 | 74.7 | 74.7 |
| | Ammonium salt (C) | Kind | — | C-1 | C-1 | C-1 | C-1 | C-1 | C-1 |
| | | Compounding amount | part by weight | 0.1 | 0.3 | 0.1 | 0.3 | 0.3 | 0.3 |
| | Component (D) | Kind | — | — | — | — | — | — | — |
| | | Compounding amount | part by weight | — | — | — | — | — | — |
| Molded article | Average fiber length | $Lw_{a1}$ | mm | 0.6 | 0.5 | 0.9 | 0.7 | 0.7 | 0.7 |
| | | $Lw_{a2}$ | mm | 4.1 | 3.3 | 5.0 | 3.9 | 4.5 | 4.4 |
| | Water absorption rate | Weight of molded article left at 80° C. × 95% RH for 24 hours/weight before water absorption | % | 3.8 | 3.7 | 3.9 | 3.7 | 3.8 | 3.8 |
| | Morphology | Particle diameter of | — | ○ | ○ | ○ | ○ | ○ | ○ |

TABLE 1-continued

|  |  |  |  |  |  |  |  |  |
|---|---|---|---|---|---|---|---|---|
|  | (B2) is 10 to 1,000 nm. Particle diameter of (B3) is 10 to 100 nm. | — | ○ | ○ | ○ | ○ | ○ | ○ |
|  | Area ratio of (B3) in (B2) is 20% or more. | — | ○ | ○ | ○ | ○ | ○ | ○ |
| Result of evaluation | Charpy impact strength | kJ/m$^2$ | 28.0 | 35.0 | 25.0 | 33.0 | 27.0 | 29.0 |
|  | Flexural strength | MPa | 180.0 | 250.0 | 150.0 | 190.0 | 190.0 | 210.0 |
|  | Flexural modulus | GPa | 12.0 | 16.0 | 8.0 | 12.0 | 12.0 | 12.0 |
|  | Modulus upon water absorption | GPa | 8.4 | 11.2 | 5.6 | 8.4 | 8.4 | 8.4 |
|  | Flowability | mm | 40.0 | 40.0 | 60.0 | 45.0 | 50.0 | 50.0 |
|  | Dispersibility | — | B | B | A | B | A | A |

TABLE 2

|  |  |  |  | Example 13 | Example 14 | Example 15 | Example 16 | Example 17 | Example 18 |
|---|---|---|---|---|---|---|---|---|---|
| Raw material | Reinforcing fibers (A) | Compounding amount | part by weight | 25.0 | 25.0 | 25.0 | 30.0 | 15.0 | 25.0 |
|  |  | Kind of fiber | — | A1/A2-1 | A1/A2-1 | A/A2-1 | A1/A2-1 | A1/A2-1 | A1/A2-1 |
|  |  | Compounding amount of (A1) to total 100 parts by weight of (A1) and (A2) | part by weight | 80.0 | 80.0 | 80.0 | 65.0 | 70.0 | 80.0 |
|  |  | Compounding amount of (A2) to total 100 parts by weight of (A1) and (A2) | part by weight | 20.0 | 20.0 | 20.0 | 35.0 | 30.0 | 20.0 |
|  | Polyamide resin composition (B) | Kind of (B1a) | — | B1a-2 | B1a-3 | B1a-3 | B1a-3 | B1a-3 | B1a-1 |
|  |  | Kind of (B1b) | — | — | — | — | — | — | — |
|  |  | Kind of (B2) | — | B2-1 | B2-1 | B2-2 | B2-2 | B2-2 | B2-1 |
|  |  | Compounding amount | part by weight | 74.7 | 74.7 | 74.7 | 69.7 | 84.7 | 74.7 |
|  | Ammonium salt (C) | Kind | — | C-1 | C-1 | C-1 | C-1 | C-1 | C-1 |
|  |  | Compounding amount | part by weight | 0.3 | 0.3 | 0.3 | 0.3 | 0.3 | 0.3 |
|  | Component (D) | Kind | — | — | — | — | — | — | D-1 |
|  |  | Compounding amount | part by weight | — | — | — | — | — | 8.0 |
| Molded article | Average fiber length | Lw$_{a1}$ | mm | 0.7 | 0.7 | 0.7 | 0.7 | 0.9 | 0.7 |
|  |  | Lw$_{a2}$ | mm | 4.5 | 4.5 | 4.5 | 3.9 | 5.0 | 4.5 |
|  | Water absorption rate | Weight of Molded article left at 80° C. × 95% RH for 24 hours/weight before water absorption | % | 3.5 | 1.2 | 1.2 | 1.1 | 1.4 | 3.7 |
|  | Morphology | Particle diameter of (B2) is 10 to 1,000 nm. | — | ○ | ○ | ○ | ○ | ○ | ○ |
|  |  | Particle diameter of (B3) is 10 to 100 nm. | — | ○ | ○ | ○ | ○ | ○ | ○ |
|  |  | Area ratio of (B3) in (B2) is 20% or more. | — | ○ | ○ | ○ | ○ | ○ | ○ |

TABLE 2-continued

| | | | | | | | | |
|---|---|---|---|---|---|---|---|---|
| Result of evaluation | Charpy impact strength | kJ/m$^2$ | 27.0 | 27.0 | 27.0 | 30.0 | 22.0 | 34.0 |
| | Flexural strength | MPa | 200.0 | 170.0 | 170.0 | 180.0 | 140.0 | 230.0 |
| | Flexural modulus | GPa | 12.0 | 12.0 | 12.0 | 16.0 | 8.0 | 12.0 |
| | Modulus upon water absorption | GPa | 8.4 | 8.4 | 8.4 | 11.2 | 5.6 | 8.4 |
| | Flowability | mm | 50.0 | 50.0 | 50.0 | 45.0 | 60.0 | 50.0 |
| | Dispersibility | — | A | A | A | B | A | A |

| | | | | Example 19 | Example 20 | Example 2 | Example 22 | Example 23 | Example 24 |
|---|---|---|---|---|---|---|---|---|---|
| Raw material | Reinforcing fibers (A) | Compounding amount | part by weight | 40.0 | 15.0 | 30.0 | 40.0 | 15.0 | 20.0 |
| | | Kind of fiber | — | A1/A2-1 | A1/A2-1 | A1/A2-1 | A1/A2-1 | A1/A2-1 | A1/A2-1 |
| | | Compounding amount of (A1) to total 100 parts by weight of (A1) and (A2) | part by weight | 75.0 | 70.0 | 65.0 | 75.0 | 70.0 | 50.0 |
| | | Compounding amount of (A2) to total 100 parts by weight of (A1) and (A2) | part by weight | 25.0 | 30.0 | 35.0 | 25.0 | 30.0 | 50.0 |
| | Polyamide resin composition (B) | Kind of (B1a) | — | B1a-1 | B1a-1 | B1a-1 | B1a-1 | B1a-1 | B1a-1 |
| | | Kind of (B1b) | — | — | — | — | — | — | — |
| | | Kind of (B2) | — | B2-1 | B2-2 | B2-1 | B2-1 | B2-1 | B2-1 |
| | | Compounding amount | part by weight | 59.9 | 84.9 | 69.7 | 59.7 | 84.7 | 79.7 |
| | Ammonium salt (C) | Kind | — | C-1 | C-1 | C-1 | C-1 | C-1 | C-1 |
| | | Compounding amount | part by weight | 0.1 | 0.1 | 0.3 | 0.3 | 0.3 | 0.3 |
| | Component (D) | Kind | — | D-1 | D-1 | D-1 | D-1 | D-1 | D-1 |
| | | Compounding amount | part by weight | 12.0 | 4.0 | 8.0 | 12.0 | 4.0 | 5.0 |
| Molded article | Average fiber length | Lw$_{a1}$ | mm | 0.5 | 0.9 | 0.7 | 0.6 | 1.0 | 0.9 |
| | | Lw$_{a2}$ | mm | 3.3 | 5.0 | 3.9 | 3.7 | 6.0 | 4.8 |
| | Water absorption rate | Weight of Molded article left at 80° C. × 95% RH for 24 hours/weight before water absorption | % | 3.5 | 3.8 | 3.6 | 3.5 | 3.8 | 3.7 |
| | Morphology | Particle diameter of (B2) is 10 to 1,000 nm. | — | ○ | ○ | ○ | ○ | ○ | ○ |
| | | Particle diameter of (B3) is 10 to 100 nm. | — | ○ | ○ | ○ | ○ | ○ | ○ |
| | | Area ratio of (B3) in (B2) is 20% or more. | — | ○ | ○ | ○ | ○ | ○ | ○ |
| Result of evaluation | Charpy impact strength | kJ/m$^2$ | | 37.0 | 23.0 | 36.0 | 35.0 | 28.0 | 30.0 |
| | Flexural strength | MPa | | 260.0 | 160.0 | 210.0 | 210.0 | 170.0 | 170.0 |
| | Flexural modulus | GPa | | 16.0 | 8.0 | 12.0 | 12.0 | 8.0 | 8.0 |
| | Modulus upon water absorption | GPa | | 11.2 | 5.6 | 8.4 | 8.4 | 5.6 | 5.6 |
| | Flowability | mm | | 35.0 | 50.0 | 45.0 | 40.0 | 60.0 | 55.0 |
| | Dispersibility | — | | A | A | B | B | A | A |

TABLE 3

| | | | | Example 25 | Example 26 | Example 27 | Example 28 | Example 29 | Example 30 |
|---|---|---|---|---|---|---|---|---|---|
| Raw material | Reinforcing fibers (A) | Compounding amount | part by weight | 25.0 | 25.0 | 25.0 | 30.0 | 30.0 | 30.0 |
| | | Kind of fiber | — | A1/A2-2 | A1/A2-3 | A1/A2-4 | A1/A2-2 | A1/A2-3 | A1/A2-4 |
| | | Compounding amount of (A1) to total 100 parts by weight of (A1) and (A2) | part by weight | 80.0 | 80.0 | 80.0 | 65.0 | 65.0 | 65.0 |
| | | Compounding amount of (A2) to total 100 parts by weight of (A1) and (A2) | part by weight | 20.0 | 20.0 | 20.0 | 35.0 | 35.0 | 35.0 |
| | Polyamide resin composition (B) | Kind of (B1a) | — | B1a-1 | B1a-1 | B1a-1 | B1a-1 | B1a-1 | B1a-1 |
| | | Kind of (B1b) | — | — | — | — | — | — | — |
| | | Kind of (B2) | — | B2-1 | B2-1 | B2-1 | B2-1 | B2-1 | B2-1 |
| | | Compounding amount | part by weight | 74.7 | 74.7 | 74.7 | 74.7 | 74.7 | 74.7 |
| | Ammonium salt (C) | Kind | — | C-1 | C-1 | C-1 | C-1 | C-1 | C-1 |
| | | Compounding amount | part by weight | 0.3 | 0.3 | 0.3 | 0.3 | 0.3 | 0.3 |
| | Component (D) | Kind | — | D-1 | D-1 | D-1 | D-1 | D-1 | D-1 |
| | | Compounding amount | part by weight | 8.0 | 8.0 | 8.0 | 8.0 | 8.0 | 8.0 |
| Molded article | Average fiber length | Lw $_{a1}$ | mm | 0.7 | 0.7 | 0.7 | 0.7 | 0.7 | 0.7 |
| | | Lw $_{a2}$ | mm | 3.5 | 3.9 | 4.2 | 3.8 | 4.0 | 4.1 |
| | Water absorption rate | Weight of molded article left at 80° C. × 95% RH for 24 hours/weight before water absorption | % | 3.7 | 3.7 | 3.7 | 3.6 | 3.6 | 3.6 |
| | Morphology | Particle diameter of (B2) is 10 to 1,000 nm. | — | ○ | ○ | ○ | ○ | ○ | ○ |
| | | Particle diameter of (B3) is 10 to 100 nm. | — | ○ | ○ | ○ | ○ | ○ | ○ |
| | | Area ratio of (B3) in (B2) is 20% or more. | — | ○ | ○ | ○ | ○ | ○ | ○ |
| Result of evaluation | Charpy impact strength | | kJ/m$^2$ | 24.0 | 30.0 | 33.0 | 30.0 | 32.0 | 33.0 |
| | Flexural strength | | MPa | 220.0 | 230.0 | 220.0 | 200.0 | 210.0 | 210.0 |
| | Flexural modulus | | GPa | 12.0 | 12.0 | 12.0 | 12.0 | 12.0 | 12.0 |
| | Modulus upon water absorption | | GPa | 8.4 | 8.4 | 8.4 | 8.4 | 8.4 | 8.4 |
| | Flowability | | mm | 50.0 | 50.0 | 50.0 | 45.0 | 45.0 | 45.0 |
| | Dispersibility | | — | A | A | A | B | B | B |

| | | | | Example 31 | Example 32 | Example 33 | Example 34 | Example 35 | Example 36 |
|---|---|---|---|---|---|---|---|---|---|
| Raw material | Reinforcing fibers (A) | Compounding amount | part by weight | 25.0 | 30.0 | 40.0 | 15.0 | 25.0 | 25.0 |
| | | Kind of fiber | — | A1/A2-1 | A1/A2-1 | A1/A2-1 | A1/A2-1 | A1/A2-1 | A1/A2-1 |
| | | Compounding amount of (A1) to total 100 parts by weight of (A1) and (A2) | part by weight | 80.0 | 65.0 | 75.0 | 70.0 | 80.0 | 80.0 |
| | | Compounding amount of | part by | 20.0 | 35.0 | 25.0 | 30.0 | 20.0 | 20.0 |

TABLE 3-continued

|  |  |  |  |  |  |  |  |  |  |
|---|---|---|---|---|---|---|---|---|---|
|  |  | (A2) to total 100 parts by weight of (A1) and (A2) | weight |  |  |  |  |  |  |
|  | Polyamide resin composition (B) | Kind of (B1a) | — | B1a-1 | B1a-1 | B1a-1 | B1a-1 | B1a-1 | B1a-1 |
|  |  | Kind of (B1b) | — | B1b-1 | B1b-1 | B1b-1 | B1b-1 | B1b-1 | B1b-1 |
|  |  | Kind of (B2) | — | B2-1 | B2-1 | B2-1 | B2-1 | B2-2 | B2-1 |
|  |  | Compounding amount | part by weight | 74.7 | 69.7 | 59.7 | 84.7 | 74.7 | 74.7 |
|  | Ammonium salt (C) | Kind | — | C-1 | C-1 | C-1 | C-1 | C-1 | C-1 |
|  |  | Compounding amount | part by weight | 0.3 | 0.3 | 0.3 | 0.3 | 0.3 | 0.3 |
|  | Component (D) | Kind | — | — | — | — | — | — | — |
|  |  | Compounding amount | part by weight | — | — | — | — | — | — |
| Molded article | Average fiber length | $Lw_{a1}$ | mm | 0.7 | 0.6 | 0.6 | 1.0 | 0.7 | 1.2 |
|  |  | $Lw_{a2}$ | mm | 4.3 | 4.1 | 4.0 | 5.0 | 4.2 | 4.4 |
|  | Water absorption rate | Weight of molded article left at 80° C. × 95% RH for 24 hours/weight before water absorption | % | 2.7 | 2.6 | 2.6 | 2.9 | 2.8 | 2.7 |
|  | Morphology | Particle diameter of (B2) is 10 to 1,000 nm. | — | ○ | ○ | ○ | ○ | ○ | ○ |
|  |  | Particle diameter of (B3) is 10 to 100 nm. | — | ○ | ○ | ○ | ○ | ○ | ○ |
|  |  | Area ratio of (B3) in (B2) is 20% or more. | — | ○ | ○ | ○ | ○ | ○ | ○ |
| Result of evaluation | Charpy impact strength | | $kJ/m^2$ | 25.5 | 29.0 | 32.5 | 22.0 | 26.0 | 29.0 |
|  | Flexural strength | | MPa | 210.0 | 205.0 | 260.0 | 160.0 | 210.0 | 235.0 |
|  | Flexural modulus | | GPa | 12.0 | 12.0 | 16.0 | 8.0 | 12.0 | 12.0 |
|  | Modulus upon water absorption | | GPa | 10.0 | 10.0 | 13.0 | 5.0 | 10.0 | 10.0 |
|  | Flowability | | mm | 50.0 | 45.0 | 40.0 | 60.0 | 50.0 | 45.0 |
|  | Dispersibility | | — | A | A | A | A | A | A |

TABLE 4

|  |  |  |  | Example 37 | Example 38 | Example 39 | Example 40 | Example 41 | Example 42 |
|---|---|---|---|---|---|---|---|---|---|
| Raw material | Reinforcing fibers (A) | Compounding amount | part by weight | 25.0 | 25.0 | 30.0 | 15.0 | 25.0 | 25.0 |
|  |  | Kind of fiber | — | A1/A2-1 | A1/A2-1 | A1/A2-1 | A1/A2-1 | A1/A2-1 | A1/A2-1 |
|  |  | Compounding amount of (A1) to total 100 parts by weight of (A1) and (A2) | part by weight | 80.0 | 80.0 | 65.0 | 70.0 | 80.0 | 80.0 |
|  |  | Compounding amount of (A2) to total 100 parts by weight of (A1) and (A2) | part by weight | 20.0 | 20.0 | 35.0 | 30.0 | 20.0 | 20.0 |
|  | Polyamide resin composition (B) | Kind of (B1a) | — | B1a-1 | B1a-1 | B1a-1 | B1a-1 | B1a-2 | B1a-1 |
|  |  | Kind of (B1b) | — | B1b-1 | B1b-1 | B1b-1 | B1b-1 | B1b-1 | B1b-2 |
|  |  | Kind of (B2) | — | B2-1 | B2-1 | B2-1 | B2-1 | B2-1 | B2-1 |
|  |  | Compounding amount | part by weight | 74.7 | 74.7 | 69.7 | 84.7 | 74.7 | 74.7 |

TABLE 4-continued

|  |  |  |  |  |  |  |  |  |
|---|---|---|---|---|---|---|---|---|
|  | Ammonium salt (C) | Kind | — | C-1 | C-1 | C-1 | C-1 | C-1 | C-1 |
|  |  | Compounding amount | part by weight | 0.3 | 0.3 | 0.3 | 0.3 | 0.3 | 0.3 |
|  | Component (D) | Kind | — | — | D-1 | D-1 | D-1 | — | — |
|  |  | Compounding amount | part by weight | — | 8.0 | 9.0 | 5.0 | — | — |
| Molded article | Average fiber length | Lw $_{a1}$ | mm | 1.6 | 0.9 | 0.6 | 1.2 | 0.7 | 0.7 |
|  |  | Lw $_{a2}$ | mm | 6.4 | 4.5 | 4.2 | 5.1 | 4.2 | 4.2 |
|  | Water absorption rate | Weight of molded article left at 80° C. × 95% RH for 24 hours/weight before water absorption | % | 2.7 | 2.7 | 2.6 | 2.7 | 2.5 | 2.6 |
|  | Morphology | Particle diameter of (B2) is 10 to 1,000 nm. | — | ○ | ○ | ○ | ○ | ○ | ○ |
|  |  | Particle diameter of (B3) is 10 to 100 nm. | — | ○ | ○ | ○ | ○ | ○ | ○ |
|  |  | Area ratio of (B3) in (B2) is 20% or more. | — | ○ | ○ | ○ | ○ | ○ | ○ |
| Result of evaluation | Charpy impact strength | | kJ/m$^2$ | 38.0 | 29.0 | 32.0 | 26.0 | 23.5 | 24.5 |
|  | Flexural strength | | MPa | 240.0 | 220.0 | 220.0 | 175.0 | 210.0 | 185.0 |
|  | Flexural modulus | | GPa | 12.0 | 12.0 | 12.0 | 8.0 | 12.0 | 12.0 |
|  | Modulus upon water absorption | | GPa | 10.0 | 10.0 | 10.0 | 5.0 | 10.0 | 11.0 |
|  | Flowability | | mm | 40.0 | 50.0 | 45.0 | 60.0 | 50.0 | 50.0 |
|  | Dispersibility | | — | B | A | A | A | A | A |

|  |  |  |  | Example 43 | Example 44 | Example 45 | Example 46 | Example 47 | Example 48 |
|---|---|---|---|---|---|---|---|---|---|
| Raw material | Reinforcing fibers (A) | Compounding amount | part by weight | 25.0 | 25.0 | 25.0 | 25.0 | 25.0 | 25.0 |
|  |  | Kind of fiber | — | A1/A2-1 | A1/A2-1 | A1/A2-1 | A1/A2-2 | A1/A2-3 | A1/A2-4 |
|  |  | Compounding amount of (A1) to total 100 parts by weight of (A1) and (A2) | part by weight | 80.0 | 80.0 | 80.0 | 80.0 | 80.0 | 80.0 |
|  |  | Compounding amount of (A2) to total 100 parts by weight of (A1) and (A2) | part by weight | 20.0 | 20.0 | 20.0 | 20.0 | 20.0 | 20.0 |
|  | Polyamide resin composition (B) | Kind of (B1a) | — | B1a-1 | B1a-1 | B1a-1 | B1a-1 | B1a-1 | B1a-1 |
|  |  | Kind of (B1b) | — | B1b-3 | B1b-2 | B1b-3 | B1b-1 | B1b-1 | B1b-1 |
|  |  | Kind of (B2) | — | B2-1 | B2-1 | B2-1 | B2-1 | B2-1 | B2-1 |
|  |  | Compounding amount | part by weight | 74.7 | 74.7 | 74.7 | 74.7 | 74.7 | 74.7 |
|  | Ammonium salt (C) | Kind | — | C-1 | C-1 | C-1 | C-1 | C-1 | C-1 |
|  |  | Compounding amount | part by weight | 0.3 | 0.3 | 0.3 | 0.3 | 0.3 | 0.3 |
|  | Component (D) | Kind | — | — | — | — | — | — | — |
|  |  | Compounding amount | part by weight | — | — | — | — | — | — |
| Molded article | Average fiber length | Lw $_{a1}$ | mm | 0.7 | 0.8 | 0.7 | 0.7 | 0.7 | 0.7 |
|  |  | Lw $_{a2}$ | mm | 4.3 | 4.2 | 4.2 | 3.6 | 3.8 | 4.2 |
|  | Water absorption rate | Weight of molded article left at 80° C. × 95% RH for 24 hours/weight | % | 2.6 | 2.6 | 2.6 | 2.7 | 2.7 | 2.7 |

TABLE 4-continued

|  |  |  |  |  |  |  |  |  |  |
|---|---|---|---|---|---|---|---|---|---|
|  | Morphology | before water absorption Particle diameter of (B2) is 10 to 1,000 nm. | — | ○ | ○ | ○ | ○ | ○ | ○ |
|  |  | Particle diameter of (B3) is 10 to 100 nm. | — | ○ | ○ | ○ | ○ | ○ | ○ |
|  |  | Area ratio of (B3) in (B2) is 20% or more. | — | ○ | ○ | ○ | ○ | ○ | ○ |
| Result of evaluation | Charpy impact strength | kJ/m$^2$ | 25.5 | 24.0 | 25.0 | 21.0 | 25.0 | 25.0 |
|  | Flexural strength | MPa | 190.0 | 190.0 | 190.0 | 195.0 | 200.0 | 205.0 |
|  | Flexural modulus | GPa | 12.0 | 12.0 | 12.0 | 12.0 | 12.0 | 12.0 |
|  | Modulus upon water absorption | GPa | 11.0 | 11.0 | 11.0 | 10.0 | 10.0 | 10.0 |
|  | Flowability | mm | 50.0 | 50.0 | 50.0 | 50.0 | 50.0 | 50.0 |
|  | Dispersibility | — | A | A | A | A | A | A |

TABLE 5

|  |  |  |  | Example 49 | Example 50 | Example 51 | Example 52 | Example 53 | Example 54 | Example 55 | Example 56 | Example 57 |
|---|---|---|---|---|---|---|---|---|---|---|---|---|
| Raw material | Reinforcing fibers (A) | Compounding amount | part by weight | 30.0 | 30.0 | 30.0 | 20.0 | 25.0 | 25.0 | 25.0 | 25.0 | 25.0 |
|  |  | Kind of fiber | — | A1/A2-2 | A1/A2-3 | A1/A2-4 | A1 | A1/A2-1 | A1/A2-1 | A1/A2-1 | A1/A2-1 | A1/A2-1 |
|  |  | Compounding amount of (A1) to total 100 parts by weight of (A1) and (A2) | part by weight | 65.0 | 65.0 | 65.0 | 100.0 | 80.0 | 80.0 | 80.0 | 80.0 | 80.0 |
|  |  | Compounding amount of (A2) to total 100 parts by weight of (A1) and (A2) | part by weight | 35.0 | 35.0 | 35.0 | — | 20.0 | 20.0 | 20.0 | 20.0 | 20.0 |
|  | Polyamide resin composition (B) | Kind of (B1a) | — | B1a-1 | B1a-1 | B1a-1 | B1a-1 | B1a-1 | B1a-3 | B1a-1 | B1a-1 | B1a-1 |
|  |  | Kind of (B1b) | — | B1b-1 | B1b-1 | B1b-1 | B1b-1 | — | — | — | B1b-1 | B1b-1 |
|  |  | Kind of (B2) | — | B2-1 | B2-1 | B2-1 | B2-5 | B2-5 | B2-5 | B2-5 | B2-5 | B2-5 |
|  |  | Compounding amount | part by weight | 69.7 | 69.7 | 69.7 | 79.7 | 74.7 | 74.7 | 74.7 | 74.7 | 74.7 |
|  | Ammonium salt (C) | Kind | — | C-1 | C-1 | C-1 | C-1 | C-1 | C-1 | C-1 | C-1 | C-1 |
|  |  | Compounding amount | part by weight | 0.3 | 0.3 | 0.3 | 0.3 | 0.3 | 0.3 | 0.3 | 0.3 | 0.3 |
|  | Component (D) | Kind | — | — | — | — | — | — | — | D-1 | — | D-1 |
|  |  | Compounding amount | part by weight | — | — | — | — | — | — | 8.0 | — | 8.0 |
| Molded article | Average fiber length | Lw$_{a1}$ | mm | 0.7 | 0.6 | 0.6 | 0.8 | 0.7 | 0.7 | 0.7 | 0.7 | 0.9 |
|  |  | Lw$_{a2}$ | mm | 3.3 | 3.6 | 4.2 | — | 4.3 | 4.5 | 4.5 | 4.3 | 4.5 |
|  | Water absorption rate | Weight of molded article left at 80° C. × 95% RH for 24 hours/weight before water absorption | % | 2.6 | 2.6 | 2.6 | 3.8 | 3.8 | 1.2 | 3.7 | 2.7 | 2.7 |
|  | Morphology | Particle diameter of (B2) is 10 to 1,000 nm. | — | ○ | ○ | ○ | ○ | ○ | ○ | ○ | ○ | ○ |
|  |  | Particle diameter of (B3) is 10 to 100 nm. | — | ○ | ○ | ○ | ○ | ○ | ○ | ○ | ○ | ○ |

TABLE 5-continued

|  |  |  | Example 49 | Example 50 | Example 51 | Example 52 | Example 53 | Example 54 | Example 55 | Example 56 | Example 57 |
|---|---|---|---|---|---|---|---|---|---|---|---|
|  | Area ratio of (B3) in (B2) is 20% or more. | — | ○ | ○ | ○ | ○ | ○ | ○ | ○ | ○ | ○ |
| Result of evaluation | Charpy impact strength | kJ/m² | 24.0 | 27.5 | 29.0 | 23.0 | 28.0 | 26.0 | 31.0 | 24.0 | 27.7 |
|  | Flexural strength | MPa | 195.0 | 205.0 | 210.0 | 210.0 | 220.0 | 180.0 | 235.0 | 215.0 | 225.0 |
|  | Flexural modulus | GPa | 12.0 | 12.0 | 12.0 | 12.0 | 12.0 | 12.0 | 12.0 | 12.0 | 12.0 |
|  | Modulus upon water absorption | GPa | 10.0 | 10.0 | 10.0 | 8.4 | 8.4 | 8.4 | 8.4 | 10.0 | 10.0 |
|  | Flowability | mm | 45.0 | 45.0 | 45.0 | 50.0 | 50.0 | 50.0 | 50.0 | 50.0 | 50.0 |
|  | Dispersibility | — | A | A | A | A | A | A | A | A | A |

TABLE 6

|  |  |  |  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 | Comparative Example 11 |
|---|---|---|---|---|---|---|---|---|---|---|---|---|---|---|
| Raw material | Reinforcing fibers (A) | Compounding amount | part by weight | 20.0 | 20.0 | 3.0 | 55.0 | 60.0 | 25.0 | 25.0 | 25.0 | 25.0 | 25.0 | 25.0 |
|  |  | Kind of fiber | — | A1 | A1 | A1 | A1 | A1/A2-1 | A1/A2-1 | A1/A2-1 | A1/A2-1 | A1/A2-1 | A1/A2-1 | A1/A2-1 |
|  |  | Compounding amount of (A1) to total 100 parts by weight of (A1) and (A2) | part by weight | 100.0 | 100.0 | 100.0 | 100.0 | 20.0 | 80.0 | 80.0 | 80.0 | 80.0 | 80.0 | 80.0 |
|  |  | Compounding amount of (A2) to total 100 parts by weight of (A1) and (A2) | part by weight | — | — | — | — | 80.0 | 20.0 | 20.0 | 20.0 | 20.0 | 20.0 | 20.0 |
|  | Polyamide resin composition (B) | Kind of (B1a) | — | B1a-1 | B1a-1 | B1a-1 | B1a- | B1a-1 | B1a- | B1a-1 | B1a-1 | B1a-1 | B1a-1 | B1a-1 |
|  |  | Kind of (B1b) | — | — | — | — | — | — | — | — | — | — | — | — |
|  |  | Kind of (B2) | — | B2-1 | — | B2-1 | B2-1 | — | B2-1 | B2-1 | B2-1 | B2-4 | B2-1 | B2-1 |
|  |  | Compounding amount | part by weight | 80.0 | 79.7 | 96.7 | 44.7 | 39.7 | 75.0 | 64.0 | 74.7 | 74.7 | 74.7 | 74.7 |
|  | Ammonium salt (C) | Kind | — | — | C-1 | C-1 | C-1 | C-1 | — | C-1 | C-1 | C-1 | C-2 | C-3 |
|  |  | Compounding amount | part by weight | — | 0.3 | 0.3 | 0.3 | 0.3 | — | 11.0 | 0.3 | 0.3 | 0.3 | 0.3 |
|  | Component (D) | Kind | — | — | — | — | — | — | — | — | — | — | — | — |
|  |  | Compounding amount | part by weight | — | — | — | — | — | — | — | — | — | — | — |
| Molded article | Average fiber length | Lw $_{a1}$ | mm | 0.7 | 0.7 | 1.0 | 0.3 | 0.3 | 0.7 | 1.3 | 0.2 | 0.7 | 0.7 | 0.7 |
|  |  | Lw $_{a2}$ | mm | — | — | — | — | 2.9 | — | 4.9 | 2.0 | 4.5 | 4.5 | 4.5 |
|  | Water absorption rate | Weight of molded article left at 80° C. × 95% RH for 24 hours/weight before water absorption | % | 3.8 | 3.9 | 4.0 | 3.2 | 3.1 | 3.8 | 3.7 | 3.8 | 3.8 | 3.8 | 3.8 |
|  | Morphology | Particle diameter of (B2) is 10 to 1,000 nm. | — | ○ | ○ | ○ | ○ | ○ | ○ | ○ | ○ | ○ | ○ | ○ |
|  |  | Particle diameter of (B3) is 10 to 100 nm. | — | ○ | ○ | ○ | ○ | ○ | ○ | ○ | ○ | ○ | ○ | ○ |
|  |  | Area ratio of (B3) in | — | ○ | ○ | ○ | ○ | ○ | ○ | ○ | ○ | ○ | ○ | ○ |

TABLE 6-continued

|  |  |  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 | Comparative Example 11 |
|---|---|---|---|---|---|---|---|---|---|---|---|---|---|
|  | (B2) is 20% or more. |  |  |  |  |  |  |  |  |  |  |  |  |
| Result of evaluation | Charpy impact strength | kJ/m$^2$ | 24.0 | 15.0 | 10.0 | 18.0 | 19.0 | 25.0 | 15.0 | 13.0 | 15.0 | 15.0 | 23.0 |
|  | Flexural strength | MPa | 160.0 | 260.0 | 100.0 | 240.0 | 130.0 | 160.0 | 200.0 | 140.0 | 200.0 | 180.0 | 160.0 |
|  | Flexural modulus | GPa | 12.0 | 15.0 | 4.0 | 30.0 | 7.0 | 12.0 | 12.0 | 12.0 | 12.0 | 12.0 | 12.0 |
|  | Modulus upon water absorption | GPa | 8.4 | 10.0 | 2.0 | 25.0 | 3.0 | 8.4 | 9.0 | 8.4 | 9.0 | 8.4 | 8.4 |
|  | Flowability | mm | 10.0 | 60.0 | 70.0 | 5.0 | 5.0 | 10.0 | 80.0 | 70.0 | 50.0 | 50.0 | 50.0 |
|  | Dispersibility | — | C | A | A | C | C | C | A | A | B | B | C |

The molded articles of Examples exhibited high flexural strength and impact property, and the inclusion of the ammonium salt (C) resulted in excellent flowability and excellent fiber dispersibility. In Examples 5 to 51 and 53 to 57, the reinforcing fibers (A) contained the carbon fibers (A1) and the organic fibers (A2) so that the molded articles particularly exhibited high impact strength. Further, in Examples 31 to 51, 56 and 57 in which the polyamide resin (B1) contained the polyamide resin (B1a) and the polyamide resin (B1b) because the water absorption rate of the molded article could be reduced, reduction of the stiffness upon water absorption could be suppressed, and as a result, further excellent fiber dispersibility and high impact properties could be exhibited. Further, even in Examples 6, 36, and 37 in which the molding back pressure was changed, the same excellent effects as those described above were exhibited. Furthermore, in Examples 18 to 30, 38 to 40, 55, and 57 in which the component (D) was contained, because the dispersibility of the carbon fibers (A1) and the organic fibers (A2) was excellent, the result in particular exhibiting high flexural strength and impact property was obtained. Also, in Examples 25 to 30 and 46 to 51 in which the organic fiber type was changed, high flexural strength and impact property were shown, and since the ammonium salt (C) and the polyamide resin (B1b) were contained, the water absorption rate of the molded article could be reduced and reduction of the stiffness upon water absorption could be suppressed, and as a result, further excellent flowability and excellent fiber dispersibility could be exhibited.

On the other hand, in Comparative Examples 1 and 6, since the ammonium salt (C) was not contained, the flowability and fiber dispersibility of the molded article were inferior. In Comparative Example 2, because the resin (B2) was not contained, the impact strength was poor. In Comparative Example 3, because the content of the carbon fibers (A1) was small, the reinforcing effect was poor, resulting in decrease in the mechanical properties of the molded article. In Comparative Examples 4 and 5, because the carbon fibers (A1) or the organic fibers (A2) was excessively contained, breakage of the fibers due to contact with each other occurred, and the length remaining fibers was shortened, resulting in low impact strength.

Further, in Comparative Example 7, since the ammonium salt (C) was excessively contained, the plasticization of the polyamide resin composition (B) was accelerated, resulting in inferior mechanical properties. In Comparative Example 8, since the back pressure during molding was set high, the length of remaining fibers of the reinforcing fibers (A) was shortened, resulting in low mechanical properties. In Comparative Example 9, the number average particle diameter of the resin (B2) was not controlled within the range of 10 to 1,000 nm, resulting in poor impact property. In Comparative Example 10, since the ammonium salt (C) was not contained and only adipic acid was used, decomposition of the polyamide resin composition (B) was accelerated, resulting in inferior mechanical properties. In Comparative Example 11, the flow modifier was used instead of the ammonium salt (C), resulting in poor fiber dispersibility.

The invention claimed is:

1. A fiber-reinforced polyamide resin composition molded article comprising 5 to 50 parts by weight of reinforcing fibers (A), 40 to 94.9 parts by weight of a polyamide resin composition (B), and 0.1 to 10 parts by weight of an ammonium salt (C) composed of ammonia and an aliphatic dicarboxylic acid having 6 to 12 carbon atoms, and characterized in that a weight average fiber length (Lwa1) of the reinforcing fibers (A) is 0.4 to 7 mm, the polyamide resin composition (B) comprises a polyamide resin (B1), a resin (B2) having a reactive functional group, and a compound (B3) produced by a reaction of the resin (B1) and the resin (B2), and the resin (B2) is dispersed in a form of particles with a number average particle diameter of 10 to 1,000 nm.

2. The fiber-reinforced polyamide resin composition molded article according to claim 1, wherein the polyamide resin (B1) contained in the polyamide resin composition (B) forms a continuous phase, the resin (B2) forms a dispersed phase, and fine particles with a diameter of 1 to 100 nm composed of the compound (B3) are contained in the dispersed phase.

3. The fiber-reinforced polyamide resin composition molded article according to claim 2, wherein a ratio of an area of the fine particles composed of the compound (B3) occupied in an area of the particles composed of the resin (B2) is 20% or more.

4. The fiber-reinforced polyamide resin composition molded article according to claim 1, wherein the resin (B2) is a resin having at least one reactive functional group selected from an amino group, a carboxyl group, a metal salt of a carboxyl group, an epoxy group, an acid anhydride group and an oxazoline group.

5. The fiber-reinforced polyamide resin composition molded article according to claim 1, wherein the resin (B2) is a polyolefin resin.

6. The fiber-reinforced polyamide resin composition molded article according to claim 1, wherein the reinforcing fibers (A) contain carbon fibers (A1) and organic fibers (A2), and contain the carbon fibers (A1) at 50 to 99 parts by weight and the organic fibers (A2) at 1 to 50 parts by weight with respect to a total of 100 parts by weight of the carbon fibers (A1) and the organic fibers (A2).

7. The fiber-reinforced polyamide resin composition molded article according to claim 6, wherein a weight average fiber length (Lwa2) of the organic fibers (A2) is 3 to 7 mm.

8. The fiber-reinforced polyamide resin composition molded article according to claim 6, wherein the organic fibers (A2) are at least one selected from the group consisting of liquid crystal polyester fibers, polyarylene sulfide fibers and fluorine fibers.

9. The fiber-reinforced polyamide resin composition molded article according to claim 1, wherein the polyamide resin (B1) is a mixture of a polyamide resin (B1a) selected from polyamide 6 and polyamide 66, and one or more polyamide resins (B1b) selected from the group consisting of polyamide 610, polyamide 612, polyamide 11, polyamide 12, polyamide 1010, polyamide 1012, and polyamide 9T, and a copolymerized polyamide containing at least one of these polyamides as a constituent component.

10. The fiber-reinforced polyamide resin composition molded article according to claim 9, wherein the polyamide resin (B1) is a mixture of polyamide 6 resin and polyamide 610 resin.

11. The fiber-reinforced polyamide resin composition molded article according to claim 9, wherein a water absorption rate when left in an environment of 80° C. and 95% RH for 24 hours is 3.0% or less.

\* \* \* \* \*